United States Patent
Azizi et al.

(10) Patent No.: US 10,348,469 B2
(45) Date of Patent: Jul. 9, 2019

(54) HEW MASTER STATION AND METHOD FOR COMMUNICATING IN ACCORDANCE WITH A SCHEDULED OFDMA TECHNIQUE ON SECONDARY CHANNELS

(71) Applicant: Intel IP Corporation, Santa Clara, CA (US)

(72) Inventors: Shahrnaz Azizi, Cupertino, CA (US); Thomas J. Kenney, Portland, OR (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/801,680

(22) Filed: Nov. 2, 2017

(65) Prior Publication Data

US 2018/0109365 A1 Apr. 19, 2018

Related U.S. Application Data

(63) Continuation of application No. 14/341,055, filed on Jul. 25, 2014, now Pat. No. 9,853,784.

(Continued)

(51) Int. Cl.
*H04W 4/00* (2018.01)
*H04L 5/00* (2006.01)
(Continued)

(52) U.S. Cl.
CPC ......... *H04L 5/0048* (2013.01); *H04B 7/0413* (2013.01); *H04B 7/2615* (2013.01);
(Continued)

(58) Field of Classification Search
CPC .................................................... H04L 5/0048
See application file for complete search history.

(56) References Cited

U.S. PATENT DOCUMENTS 7,466,964 B2   12/2008   Sondur
7,809,020 B2   10/2010   Douglas et al.
(Continued)

FOREIGN PATENT DOCUMENTS

CN   1251671   4/2000
CN   1640063   7/2005
(Continued)

OTHER PUBLICATIONS

"11ah Preamble for 2Mhz and Beyond", IEEE Submission No. IEEE 802.1-11/1483r2, 1-24.
(Continued)

*Primary Examiner* — Gerald A Smarth
(74) *Attorney, Agent, or Firm* — Schwegman Lundberg & Woessner, P.A.

(57) ABSTRACT

Embodiments of a high-efficiency WLAN (HEW) master station and method for communicating in accordance with a scheduled OFDMA technique on secondary channels are generally described herein. An access point is configured to operate as part of a basic-service set (BSS) that includes a plurality of high-efficiency WLAN (HEW) stations and a plurality of legacy stations. The BSS operates on a primary channel and one or more secondary channels. In accordance with some embodiments, the access point may communicate with one or more of the HEW stations on one or more of the secondary channels in accordance with a scheduled OFDMA communication technique when the primary channel is utilized for communication with one or more of the legacy devices.

20 Claims, 5 Drawing Sheets

Related U.S. Application Data

(60) Provisional application No. 61/973,376, filed on Apr. 1, 2014, provisional application No. 61/976,951, filed on Apr. 8, 2014, provisional application No. 61/986,256, filed on Apr. 30, 2014, provisional application No. 61/986,250, filed on Apr. 30, 2014, provisional application No. 61/991,730, filed on May 12, 2014, provisional application No. 62/013,869, filed on Jun. 18, 2014, provisional application No. 62/024,801, filed on Jul. 15, 2014, provisional application No. 61/906,059, filed on Nov. 19, 2013.

(51) Int. Cl.
| | |
|---|---|
| H04L 27/26 | (2006.01) |
| H04W 74/04 | (2009.01) |
| H04W 52/24 | (2009.01) |
| H04W 72/04 | (2009.01) |
| H04W 74/02 | (2009.01) |
| H04L 1/00 | (2006.01) |
| H04L 27/34 | (2006.01) |
| H04W 74/08 | (2009.01) |
| H04B 7/0413 | (2017.01) |
| H04B 7/26 | (2006.01) |
| H04W 52/02 | (2009.01) |
| H04W 84/12 | (2009.01) |
| H04W 88/10 | (2009.01) |
| H04W 88/08 | (2009.01) |

(52) U.S. Cl.
CPC ............ *H04L 1/0071* (2013.01); *H04L 5/001* (2013.01); *H04L 5/0007* (2013.01); *H04L 5/0035* (2013.01); *H04L 5/0037* (2013.01); *H04L 5/0053* (2013.01); *H04L 5/0094* (2013.01); *H04L 27/261* (2013.01); *H04L 27/2602* (2013.01); *H04L 27/3405* (2013.01); *H04L 27/3483* (2013.01); *H04W 52/0206* (2013.01); *H04W 52/244* (2013.01); *H04W 72/042* (2013.01); *H04W 72/0406* (2013.01); *H04W 72/0426* (2013.01); *H04W 72/0453* (2013.01); *H04W 72/0473* (2013.01); *H04W 74/02* (2013.01); *H04W 74/04* (2013.01); *H04W 74/08* (2013.01); *H04L 5/003* (2013.01); *H04L 5/0098* (2013.01); *H04W 74/0808* (2013.01); *H04W 84/12* (2013.01); *H04W 88/08* (2013.01); *H04W 88/10* (2013.01); *Y02D 70/00* (2018.01); *Y02D 70/122* (2018.01); *Y02D 70/1262* (2018.01); *Y02D 70/142* (2018.01); *Y02D 70/449* (2018.01)

(56) References Cited

U.S. PATENT DOCUMENTS

| | | | |
|---|---|---|---|
| 8,395,997 | B2 | 3/2013 | Banerjea et al. |
| 8,509,323 | B2 | 8/2013 | Nangia et al. |
| 8,560,009 | B2 | 10/2013 | Etemad |
| 8,948,064 | B2 | 2/2015 | Shahar |
| 8,989,158 | B2 | 3/2015 | Seok |
| 9,160,503 | B2 | 10/2015 | Kim et al. |
| 9,271,241 | B2 | 2/2016 | Kenney et al. |
| 9,325,463 | B2 | 4/2016 | Azizi et al. |
| 9,450,725 | B2 | 9/2016 | Azizi et al. |
| 9,462,504 | B2 | 10/2016 | Stephens et al. |
| 9,544,914 | B2 | 1/2017 | Azizi et al. |
| 9,615,291 | B2 | 4/2017 | Kenney et al. |
| 9,648,620 | B2 | 5/2017 | Tandra |
| 9,680,603 | B2 | 6/2017 | Azizi et al. |
| 9,705,643 | B2 | 7/2017 | Li et al. |
| 9,838,961 | B2 | 12/2017 | Kenney et al. |
| 9,853,784 | B2 | 12/2017 | Azizi et al. |
| 9,867,210 | B2 | 1/2018 | Azizi |
| 9,882,695 | B2 | 1/2018 | Azizi et al. |
| 9,900,906 | B2 | 2/2018 | Li et al. |
| 9,961,678 | B2 | 5/2018 | Li et al. |
| 10,177,888 | B2 | 1/2019 | Azizi et al. |
| 2004/0054820 | A1 | 3/2004 | Karaoguz et al. |
| 2004/0146117 | A1 | 7/2004 | Subramaniam et al. |
| 2005/0015703 | A1 | 1/2005 | Terry et al. |
| 2005/0063336 | A1 | 3/2005 | Kim et al. |
| 2005/0135410 | A1 | 6/2005 | Stephens |
| 2005/0276347 | A1 | 12/2005 | Mujtaba et al. |
| 2006/0018249 | A1 | 1/2006 | Shearer et al. |
| 2006/0030322 | A1 | 2/2006 | Kim et al. |
| 2006/0062314 | A1 | 3/2006 | Palin et al. |
| 2006/0067415 | A1 | 3/2006 | Mujtaba |
| 2006/0105764 | A1 | 5/2006 | Krishnaswamy et al. |
| 2006/0153060 | A1 | 7/2006 | Cho |
| 2007/0014375 | A1 | 1/2007 | Nakao |
| 2007/0042715 | A1 | 2/2007 | Salo et al. |
| 2007/0060161 | A1 | 3/2007 | Chindapol et al. |
| 2007/0147226 | A1 | 6/2007 | Khandekar et al. |
| 2007/0147521 | A1 | 6/2007 | Horng et al. |
| 2007/0153929 | A1* | 7/2007 | Ballentin ............... H04L 5/0053 375/260 |
| 2007/0202816 | A1 | 8/2007 | Zheng |
| 2007/0207742 | A1 | 9/2007 | Kim et al. |
| 2007/0242600 | A1 | 10/2007 | Li et al. |
| 2008/0013496 | A1 | 1/2008 | Dalmases et al. |
| 2008/0049851 | A1 | 2/2008 | Nangia et al. |
| 2008/0188232 | A1 | 8/2008 | Park et al. |
| 2008/0232339 | A1 | 9/2008 | Yang et al. |
| 2008/0240018 | A1 | 10/2008 | Xue et al. |
| 2008/0240275 | A1 | 10/2008 | Cai |
| 2009/0007185 | A1 | 1/2009 | Nix et al. |
| 2009/0122882 | A1 | 5/2009 | Mujtaba |
| 2009/0270109 | A1 | 10/2009 | Wang Helmersson et al. |
| 2009/0310692 | A1 | 12/2009 | Kafle et al. |
| 2010/0046671 | A1 | 2/2010 | Ali et al. |
| 2010/0067480 | A1 | 3/2010 | Wang et al. |
| 2010/0080312 | A1 | 4/2010 | Moffatt et al. |
| 2010/0091673 | A1 | 4/2010 | Sawai et al. |
| 2010/0098181 | A1 | 4/2010 | Jacobsen et al. |
| 2010/0107042 | A1 | 4/2010 | Sawai et al. |
| 2010/0110804 | A1 | 5/2010 | Yeh |
| 2010/0157956 | A1 | 6/2010 | Takahashi |
| 2010/0157970 | A1 | 6/2010 | Gotman et al. |
| 2010/0172316 | A1 | 7/2010 | Hwang et al. |
| 2010/0220678 | A1 | 9/2010 | Wentink |
| 2010/0220679 | A1 | 9/2010 | Abraham et al. |
| 2010/0246375 | A1 | 9/2010 | Orlik et al. |
| 2010/0246539 | A1 | 9/2010 | Guillouard et al. |
| 2010/0260159 | A1 | 10/2010 | Zhang et al. |
| 2010/0309834 | A1 | 12/2010 | Fischer et al. |
| 2010/0322166 | A1 | 12/2010 | Sampath et al. |
| 2011/0002219 | A1 | 1/2011 | Kim et al. |
| 2011/0013608 | A1 | 1/2011 | Lee et al. |
| 2011/0026623 | A1 | 2/2011 | Srinivasa et al. |
| 2011/0032850 | A1 | 2/2011 | Cai |
| 2011/0032875 | A1 | 2/2011 | Erceg et al. |
| 2011/0038441 | A1 | 2/2011 | Shi |
| 2011/0063991 | A1 | 3/2011 | Sampath et al. |
| 2011/0075625 | A1 | 3/2011 | Nyström et al. |
| 2011/0085513 | A1 | 4/2011 | Chen et al. |
| 2011/0096685 | A1 | 4/2011 | Lee et al. |
| 2011/0110454 | A1 | 5/2011 | Sampath et al. |
| 2011/0116401 | A1 | 5/2011 | Banerjea et al. |
| 2011/0149882 | A1 | 6/2011 | Gong et al. |
| 2011/0150148 | A1 | 6/2011 | Son et al. |
| 2011/0188598 | A1 | 8/2011 | Lee et al. |
| 2011/0194544 | A1 | 8/2011 | Yang et al. |
| 2011/0206156 | A1 | 8/2011 | Lee et al. |
| 2011/0222486 | A1 | 9/2011 | Hart |
| 2011/0235593 | A1 | 9/2011 | Gong et al. |
| 2011/0243025 | A1 | 10/2011 | Kim et al. |
| 2011/0249660 | A1 | 10/2011 | Noh et al. |
| 2011/0261708 | A1 | 10/2011 | Grandhi |
| 2011/0261769 | A1 | 10/2011 | Ji et al. |

(56) References Cited

U.S. PATENT DOCUMENTS

| | | |
|---|---|---|
| 2011/0268094 A1 | 11/2011 | Gong et al. |
| 2011/0299474 A1 | 12/2011 | Li et al. |
| 2011/0305296 A1 | 12/2011 | Van Nee |
| 2012/0002756 A1 | 1/2012 | Zhang et al. |
| 2012/0063433 A1 | 3/2012 | Wentink |
| 2012/0106362 A1 | 5/2012 | Reumerman et al. |
| 2012/0106481 A1 | 5/2012 | Cho et al. |
| 2012/0127940 A1 | 5/2012 | Lee et al. |
| 2012/0155424 A1 | 6/2012 | Kim et al. |
| 2012/0155444 A1 | 6/2012 | Chiueh et al. |
| 2012/0170563 A1 | 7/2012 | Abraham et al. |
| 2012/0201213 A1 | 8/2012 | Banerjea et al. |
| 2012/0218983 A1 | 8/2012 | Noh et al. |
| 2012/0243485 A1 | 9/2012 | Merlin et al. |
| 2012/0269124 A1 | 10/2012 | Porat |
| 2012/0275446 A1 | 11/2012 | Stacey et al. |
| 2012/0314697 A1 | 12/2012 | Noh et al. |
| 2012/0314786 A1 | 12/2012 | Atungsiri et al. |
| 2012/0320890 A1 | 12/2012 | Zhang et al. |
| 2012/0324315 A1 | 12/2012 | Zhang et al. |
| 2012/0327870 A1 | 12/2012 | Grandhi et al. |
| 2012/0327915 A1 | 12/2012 | Kang et al. |
| 2013/0070642 A1 | 3/2013 | Kim et al. |
| 2013/0136075 A1 | 5/2013 | Yu et al. |
| 2013/0136157 A1 | 5/2013 | Son et al. |
| 2013/0142155 A1 | 6/2013 | Trainin et al. |
| 2013/0177090 A1* | 7/2013 | Yang .................. H04L 41/16 375/260 |
| 2013/0188567 A1 | 7/2013 | Wang et al. |
| 2013/0188572 A1 | 7/2013 | Cheong et al. |
| 2013/0215993 A1 | 8/2013 | Taghavi Nasrabadi et al. |
| 2013/0229996 A1 | 9/2013 | Wang et al. |
| 2013/0230035 A1 | 9/2013 | Grandhi et al. |
| 2013/0235720 A1 | 9/2013 | Wang et al. |
| 2013/0250940 A1 | 9/2013 | Parlamas et al. |
| 2013/0258975 A1 | 10/2013 | Krishnamurthy et al. |
| 2013/0265907 A1 | 10/2013 | Kim et al. |
| 2013/0286925 A1 | 10/2013 | Fischer et al. |
| 2013/0286959 A1 | 10/2013 | Lou et al. |
| 2013/0301551 A1 | 11/2013 | Ghosh et al. |
| 2013/0301563 A1 | 11/2013 | Gupta et al. |
| 2014/0010196 A1 | 1/2014 | Shapira |
| 2014/0016607 A1 | 1/2014 | Hart |
| 2014/0112274 A1 | 4/2014 | Moon et al. |
| 2014/0169245 A1 | 6/2014 | Kenney et al. |
| 2014/0169356 A1 | 6/2014 | Noh et al. |
| 2014/0205029 A1 | 7/2014 | Srinivasa et al. |
| 2014/0211775 A1* | 7/2014 | Sampath .............. H04W 28/06 370/338 |
| 2014/0269544 A1 | 9/2014 | Zhu et al. |
| 2014/0307650 A1 | 10/2014 | Vermani et al. |
| 2014/0369276 A1 | 12/2014 | Porat et al. |
| 2015/0023335 A1 | 1/2015 | Vermani et al. |
| 2015/0063255 A1 | 3/2015 | Tandra et al. |
| 2015/0063318 A1 | 3/2015 | Merlin et al. |
| 2015/0085836 A1 | 3/2015 | Kang et al. |
| 2015/0117428 A1 | 4/2015 | Lee et al. |
| 2015/0124690 A1 | 5/2015 | Merlin et al. |
| 2015/0124745 A1 | 5/2015 | Tandra et al. |
| 2015/0131517 A1 | 5/2015 | Chu et al. |
| 2015/0131756 A1 | 5/2015 | Suh et al. |
| 2015/0139090 A1 | 5/2015 | Stephens et al. |
| 2015/0139091 A1 | 5/2015 | Azizi et al. |
| 2015/0139118 A1 | 5/2015 | Azizi et al. |
| 2015/0139119 A1 | 5/2015 | Azizi et al. |
| 2015/0139205 A1* | 5/2015 | Kenney ............... H04W 52/241 370/338 |
| 2015/0139206 A1 | 5/2015 | Azizi et al. |
| 2015/0146808 A1 | 5/2015 | Chu et al. |
| 2015/0207599 A1 | 7/2015 | Kim et al. |
| 2015/0208394 A1 | 7/2015 | Seo et al. |
| 2015/0237531 A1 | 8/2015 | Hao et al. |
| 2015/0288489 A1 | 10/2015 | Azizi et al. |
| 2015/0326351 A1 | 11/2015 | Kim et al. |
| 2015/0326403 A1* | 11/2015 | Dwelley ............... H04L 12/10 713/300 |
| 2015/0326408 A1* | 11/2015 | Vermani .............. H04L 1/0625 370/328 |
| 2015/0327121 A1 | 11/2015 | Li et al. |
| 2016/0020885 A1 | 1/2016 | Li et al. |
| 2016/0112899 A1 | 4/2016 | Kenney et al. |
| 2016/0211944 A1 | 7/2016 | Kenney et al. |
| 2016/0211961 A1 | 7/2016 | Azizi et al. |
| 2016/0227572 A1 | 8/2016 | Li et al. |
| 2016/0241366 A1 | 8/2016 | Azizi et al. |
| 2016/0242173 A1 | 8/2016 | Li et al. |
| 2016/0344531 A1 | 11/2016 | Li et al. |
| 2017/0005709 A1 | 1/2017 | Li et al. |
| 2017/0019916 A1 | 1/2017 | Azizi et al. |
| 2017/0111154 A1 | 4/2017 | Azizi et al. |
| 2017/0135035 A1 | 5/2017 | Azizi et al. |
| 2017/0201359 A1 | 7/2017 | Li et al. |
| 2018/0199368 A1 | 7/2018 | Li et al. |

FOREIGN PATENT DOCUMENTS

| | | |
|---|---|---|
| CN | 1918818 A | 2/2007 |
| CN | 101005344 A | 7/2007 |
| CN | 101018104 A | 8/2007 |
| CN | 101102245 A | 1/2008 |
| CN | 101202611 A | 6/2008 |
| CN | 101248697 A | 8/2008 |
| CN | 101374127 A | 2/2009 |
| CN | 101433018 A | 5/2009 |
| CN | 101485135 A | 7/2009 |
| CN | 101518010 A | 8/2009 |
| CN | 101529824 A | 9/2009 |
| CN | 101572683 A | 11/2009 |
| CN | 101796750 | 8/2010 |
| CN | 102090024 A | 6/2011 |
| CN | 102171981 A | 8/2011 |
| CN | 102201891 A | 9/2011 |
| CN | 102281247 | 12/2011 |
| CN | 102355715 A | 2/2012 |
| CN | 102420794 A | 4/2012 |
| CN | 102428672 A | 4/2012 |
| CN | 102474386 A | 5/2012 |
| CN | 102474488 | 5/2012 |
| CN | 102577493 A | 7/2012 |
| CN | 102638671 | 8/2012 |
| CN | 102761390 A | 10/2012 |
| CN | 102833057 A | 12/2012 |
| CN | 102948123 | 2/2013 |
| CN | 103002448 A | 3/2013 |
| CN | 103119982 A | 5/2013 |
| CN | 103560868 | 2/2014 |
| CN | 103703711 A | 4/2014 |
| CN | 105379217 A | 3/2016 |
| CN | 105637968 A | 6/2016 |
| CN | 105659656 A | 6/2016 |
| CN | 105659681 A | 6/2016 |
| CN | 105706407 A | 6/2016 |
| CN | 105900511 A | 8/2016 |
| CN | 105917611 A | 8/2016 |
| CN | 105917730 A | 8/2016 |
| CN | 106100807 A | 11/2016 |
| CN | 106105080 A | 11/2016 |
| CN | 106464634 A | 2/2017 |
| CN | 106464638 A | 2/2017 |
| CN | 106464652 A | 2/2017 |
| CN | 106465360 A | 2/2017 |
| CN | 106899385 A | 6/2017 |
| CN | 107947850 A | 4/2018 |
| CN | 108494538 A | 9/2018 |
| EP | 2209276 A2 | 7/2010 |
| EP | 2362580 A2 | 8/2011 |
| EP | 2499872 A1 | 9/2012 |
| EP | 3072254 A1 | 9/2016 |
| EP | 3072255 A1 | 9/2016 |
| EP | 3072270 A1 | 9/2016 |
| EP | 3072324 A1 | 9/2016 |
| EP | 3072344 A1 | 9/2016 |
| EP | 3072345 A1 | 9/2016 |

(56) References Cited

FOREIGN PATENT DOCUMENTS

| | | |
|---|---|---|
| EP | 3072347 A1 | 9/2016 |
| JP | 2007074689 A | 3/2007 |
| KR | 1020110044938 A | 5/2011 |
| KR | 1020120127676 A | 11/2012 |
| TW | 200539601 A | 12/2005 |
| TW | 201044815 A | 12/2010 |
| TW | 201141288 A | 11/2011 |
| TW | 201141288 A1 | 11/2011 |
| TW | 201234880 A | 8/2012 |
| TW | 201251382 A | 12/2012 |
| TW | 201301827 A | 1/2013 |
| TW | 201306533 A | 2/2013 |
| TW | 201322786 A | 6/2013 |
| TW | 201322786 A1 | 6/2013 |
| TW | 201349815 A | 12/2013 |
| TW | 201406107 A | 2/2014 |
| TW | 201534073 A | 9/2015 |
| TW | 201534074 A | 9/2015 |
| TW | 201538023 A | 10/2015 |
| TW | 201540029 A | 10/2015 |
| TW | 201540118 A | 10/2015 |
| TW | 201541889 A | 11/2015 |
| TW | 201541890 A | 11/2015 |
| TW | 201547248 A | 12/2015 |
| TW | 201547313 A | 12/2015 |
| TW | 201605191 A | 2/2016 |
| TW | 201605271 A | 2/2016 |
| TW | 201608863 A | 3/2016 |
| TW | 201622458 A | 6/2016 |
| TW | 201632022 A | 9/2016 |
| TW | I572160 B | 2/2017 |
| TW | I572173 B | 2/2017 |
| TW | I573413 B | 3/2017 |
| TW | I578733 B | 4/2017 |
| TW | I578837 B | 4/2017 |
| TW | I578838 B | 4/2017 |
| TW | I586120 B | 6/2017 |
| TW | 201728116 A | 8/2017 |
| TW | I611721 B | 1/2018 |
| TW | I626839 B | 6/2018 |
| TW | I632820 | 8/2018 |
| TW | I642281 | 11/2018 |
| TW | I642292 | 11/2018 |
| WO | WO-2005053198 A2 | 6/2005 |
| WO | WO-2007050891 A1 | 5/2007 |
| WO | WO-2008118429 A1 | 10/2008 |
| WO | WO-2010118383 A1 | 10/2010 |
| WO | WO-2011023088 A1 | 3/2011 |
| WO | WO-2011025146 A2 | 3/2011 |
| WO | WO-2011068387 A2 | 6/2011 |
| WO | WO-2011153507 A2 | 12/2011 |
| WO | WO-2012057547 A2 | 5/2012 |
| WO | WO-2012106635 A1 | 8/2012 |
| WO | WO-2013055117 A2 | 4/2013 |
| WO | WO-2013058512 A1 | 4/2013 |
| WO | WO-2013077653 A1 | 5/2013 |
| WO | WO-2013089404 A1 | 6/2013 |
| WO | WO-2013165582 A1 | 11/2013 |
| WO | WO-2013191609 A1 | 12/2013 |
| WO | WO-2014066785 A1 | 5/2014 |
| WO | WO-2015031323 A1 | 3/2015 |
| WO | WO-2015076917 A1 | 5/2015 |
| WO | WO-2015076923 A1 | 5/2015 |
| WO | WO-2015076932 A1 | 5/2015 |
| WO | WO-2015077040 A1 | 5/2015 |
| WO | WO-2015077040 A8 | 5/2015 |
| WO | WO-2015077042 A1 | 5/2015 |
| WO | WO-2015077049 A1 | 5/2015 |
| WO | WO-2015077056 A1 | 5/2015 |
| WO | WO-2015077068 A1 | 5/2015 |
| WO | WO-2015077096 A1 | 5/2015 |
| WO | WO-2015077223 A1 | 5/2015 |
| WO | WO-2015127777 A1 | 9/2015 |
| WO | WO-2015130335 A1 | 9/2015 |
| WO | WO-2015130341 A1 | 9/2015 |
| WO | WO-2015171243 A1 | 11/2015 |
| WO | WO-2015195460 A1 | 12/2015 |
| WO | WO-2016010578 A1 | 1/2016 |
| WO | WO-2016010651 A1 | 1/2016 |

OTHER PUBLICATIONS

"U.S. Appl. No. 14/304,041, Notice of Allowance dated Oct. 8, 2015", 8 pgs.

"U.S. Appl. No. 14/304,041, Supplemental Notice of Allowability dated Nov. 4, 2015", 5 pgs.

"U.S. Appl. No. 14/315,562, Examiner Interview Summary dated Jun. 20, 2016", 2 pgs.

"U.S. Appl. No. 14/315,562, Final Office Action dated Mar. 21, 2016", 16 pgs.

"U.S. Appl. No. 14/315,562, Non Final Office Action dated Sep. 25, 2015", 14 pgs.

"U.S. Appl. No. 14/315,562, Notice of Allowability dated Jun. 20, 2016", 7 pgs.

"U.S. Appl. No. 14/315,562, Notice of Allowance dated Jun. 6, 2016", 12 pgs.

"U.S. Appl. No. 14/315,562, Response filed May 16, 2016 to Final Office Action dated Mar. 21, 2016", 10 pgs.

"U.S. Appl. No. 14/315,562, Response filed Dec. 28, 2015 to Non Final Office Action dated Sep. 25, 2015", 9 pgs.

"U.S. Appl. No. 14/338,137, Corrected Notice of Allowance dated Jan. 22, 2016", 10 pgs.

"U.S. Appl. No. 14/447,254, Advisory Action dated Feb. 13, 2017", 4 pgs.

"U.S. Appl. No. 14/447,254, Examiner Interview Summary dated Jan. 18, 2017", 3 pgs.

"U.S. Appl. No. 14/447,254, Examiner Interview Summary dated Jul. 22, 2016", 4 pgs.

"U.S. Appl. No. 14/447,254, Final Office Action dated Sep. 14, 2016", 13 pgs.

"U.S. Appl. No. 14/447,254, Non Final Office Action dated Mar. 31, 2016", 13 pgs.

"U.S. Appl. No. 14/447,254, Response filed Jan. 17, 2017 Final Office Action dated Sep. 14, 2016", 11 pgs.

"U.S. Appl. No. 14/447,254, Response filed Aug. 1, 2016 to Non Final Office Action dated Mar. 31, 2016", 12 pgs.

"U.S. Appl. No. 14/458,000, Final Office Action dated May 9, 2016", 11 pgs.

"U.S. Appl. No. 14/458,000, Notice of Allowance dated Aug. 24, 2016", 11 pgs.

"U.S. Appl. No. 14/458,000, Response filed Mar. 3, 2015 to Non Final Office Action dated Dec. 3, 2015", 15 pgs.

"U.S. Appl. No. 14/458,000, Response filed Aug. 8, 2016 to Final Office Action dated May 9, 2016", 12 pgs.

"U.S. Appl. No. 14/459,385, Response filed May 4, 2016 to Non Final Office Action dated Jan. 14, 2016", 9 pgs.

"U.S. Appl. No. 14/498,385, Examiner Interview Summary dated Jan. 20, 2017", 3 pgs.

"U.S. Appl. No. 14/498,385, Examiner Interview Summary dated Aug. 2, 2017", 3 pgs.

"U.S. Appl. No. 14/498,385, Final Office Action dated Aug. 11, 2016", 20 pgs.

"U.S. Appl. No. 14/498,385, Non Final Office Action dated Jan. 14, 2016", 19 pgs.

"U.S. Appl. No. 14/498,385, Non Final Office Action dated Mar. 9, 2017", 12 pgs.

"U.S. Appl. No. 14/498,385, Response filed Feb. 13, 2017 to Final Office Action dated Aug. 11, 2016", 9 pgs.

"U.S. Appl. No. 14/498,385, Response filed Jul. 10, 2017 to Non Final Office Action dated Mar. 9, 2017", 8 pgs.

"U.S. Appl. No. 14/563,406, Advisory Action dated Jan. 23, 2017", 3 pgs.

"U.S. Appl. No. 14/563,406, Corrected Notice of Allowance dated Jun. 14, 2017", 2 pgs.

"U.S. Appl. No. 14/563,406, Examiner Interview Summary dated Jan. 18, 2017", 3 pgs.

(56) References Cited

OTHER PUBLICATIONS

"U.S. Appl. No. 14/563,406, Examiner Interview Summary dated Jul. 26, 2016", 3 pgs.
"U.S. Appl. No. 14/563,406, Final Office Action dated Aug. 9, 2016", 15 pgs.
"U.S. Appl. No. 14/563,406, Non Final Office Action dated Apr. 26, 2016", 12 pgs.
"U.S. Appl. No. 14/563,406, Notice of Allowance dated Mar. 7, 2017", 7 pgs.
"U.S. Appl. No. 14/563,406, Response filed Jan. 9, 2017 to Final Office Action dated Aug. 9, 2016", 9 pgs.
"U.S. Appl. No. 14/563,406, Response filed Jul. 26, 2016 to Non Final Office Action dated Apr. 26, 2016", 9 pgs.
"U.S. Appl. No. 14/573,912, Non Final Office Action dated Jun. 16, 2016", 7 pgs.
"U.S. Appl. No. 14/573,912, Notice of Allowability dated Jan. 13, 2017", 4 pgs.
"U.S. Appl. No. 14/573,912, Notice of Allowability dated May 11, 2017", 2 pgs.
"U.S. Appl. No. 14/573,912, Notice of Allowability dated Dec. 9, 2016", 2 pgs.
"U.S. Appl. No. 14/573,912, Notice of Allowance dated Nov. 3, 2016", 7 pgs.
"U.S. Appl. No. 14/573,912, Response filed Oct. 17, 2016 to Non Final Office Action dated Jun. 16, 2016", 11 pgs.
"U.S. Appl. No. 14/977,405, Examiner Interview Summary dated Jul. 25, 2016", 3 pgs.
"U.S. Appl. No. 14/977,405, Final Office Action dated Aug. 24, 2016", 8 pgs.
"U.S. Appl. No. 14/977,405, Non Final Office Action dated Feb. 26, 2016", 7 pgs.
"U.S. Appl. No. 14/977,405, Notice of Allowance dated Nov. 18, 2016", 8 pgs.
"U.S. Appl. No. 14/977,405, Preliminary Amendment filed Dec. 22, 2015", 11 pgs.
"U.S. Appl. No. 14/977,405, Response filed Jul. 20, 2016 to Non Final Office Action dated Feb. 26, 2016", 11 pgs.
"U.S. Appl. No. 14/977,405, Response filed Oct. 24, 2016 to Final Office Action dated Aug. 24, 2016", 11 pgs.
"U.S. Appl. No. 15/023,262, Notice of Allowance dated Dec. 21, 2017", 8 pgs.
"U.S. Appl. No. 15/023,581, Non Final Office Action dated Jan. 17, 2017", 10 pgs.
"U.S. Appl. No. 15/023,581, Notice of Allowance dated Jul. 27, 2017", 8 pgs.
"U.S. Appl. No. 15/023,581, Preliminary Amendment filed Mar. 21, 2016", 3 pgs.
"U.S. Appl. No. 15/023,581, Response filed Apr. 11, 2017 to Non Final Office Action dated Jan. 17, 2017", 15 pgs.
"U.S. Appl. No. 15/025,634 , Response filed Jan. 25, 2018 to Non Final Office Action dated Oct. 27, 2017", 13 pgs.
"U.S. Appl. No. 15/025,634, Non Final Office Action dated Oct. 27, 2017", 21 pgs.
"U.S. Appl. No. 15/025,634, Preliminary Amendment filed Mar. 29, 2016", 9 pgs.
"U.S. Appl. No. 15/026,022, Corrected Notice of Allowance dated Dec. 13, 2017", 2 pgs.
"U.S. Appl. No. 15/052,600, Corrected Notice of Allowance dated Jun. 24, 2016", 7 pgs.
"U.S. Appl. No. 15/052,600, Corrected Notice of Allowance dated Aug. 5, 2016", 7 pgs.
"U.S. Appl. No. 15/052,600, Notice of Allowance dated May 20, 2016", 10 pgs.
"U.S. Appl. No. 15/052,600, Preliminary Amendment filed Apr. 1, 2016", 10 pgs.
"U.S. Appl. No. 15/113,214, Restriction Requirement dated Aug. 10, 2017", 6 pgs.
"U.S. Appl. No. 15/263,864, Corrected Notice of Allowance dated Feb. 5, 2018", 5 pgs.
"U.S. Appl. No. 15/263,864, Corrected Notice of Allowance dated Dec. 14, 2017", 6 pgs.
"U.S. Appl. No. 15/263,864, Non Final Office Action dated Mar. 10, 2017", 4 pgs.
"U.S. Appl. No. 15/263,864, Notice of Allowance dated Nov. 9, 2017", 7 pgs.
"U.S. Appl. No. 15/263,864, Response filed Jun. 9, 2017 to Non Final Office Action dated Mar. 10, 2017", 9 pgs.
"U.S. Appl. No. 15/280,782, Corrected Notice of Allowance dated Nov. 3, 2017", 2 pgs.
"U.S. Appl. No. 15/280,782, Non Final Office Action dated May 12, 2017", 25 pgs.
"U.S. Appl. No. 15/394,069, Corrected Notice of Allowance dated Nov. 9, 2017", 2 pgs.
"U.S. Appl. No. 15/394,069, Non Final Office Action dated May 26, 2017", 18 pgs.
"U.S. Appl. No. 15/644,937, Preliminary Amendment filed Aug. 30, 2017", 8 pgs.
"Chinese Application Serial No. 201580025791.6, Voluntary Amendment filed on Jun. 21, 2017", (W/ English Claims), 16 pgs.
"Chinese Application Serial No. 201580079973.7, Voluntary Amendment filed on Jun. 15, 2017", (W/ English Translation), 12 pgs.
"Chinese Application Serial No. 201710063899.5, Voluntary Amendment Filed on Oct. 20, 2017", (W/ English Claims), 23 pgs.
"European Application Serial No. 14863133.6, Response Filed Jan. 17, 2018 to Extended European Search Report dated Jul. 3, 2017", 12 pgs.
"European Application Serial No. 14863142.7, Response Filed Nov. 15, 2017 to Extended European Search Report dated May 3, 2017", 13 pgs.
"European Application Serial No. 14863362.1, Extended European Search Report dated Jul. 18, 2018", 8 pgs.
"European Application Serial No. 14863362.1, Response filed Dec. 20, 2016 to Communication pursuant to Rules 161(2) and 162 EPC dated Jun. 28, 2016", 21 pgs.
"European Application Serial No. 14864107.9, Extended European Search Report dated Jul. 27, 2017", 13 pgs.
"European Application Serial No. 14864636.7, Extended European Search Report dated Jul. 21, 2017", 8 pgs.
"European Application Serial No. 14864636.7, Response filed Jan. 29, 2018 to Extended European Search Report dated Jul. 21, 2017", 21 pgs.
"European Application Serial No. 14864664.9, Response filed Dec. 22, 2016 to Communication pursuant to Rules 161(2) and 162 EPC dated Jun. 28, 2016", 4 pgs.
"European Application Serial No. 14864680.5, Extended European Search Report dated Jul. 18, 2017", 11 pgs.
"European Application Serial No. 14864680.5, Response Filed Feb. 8, 2018 to Extended European Search Report dated Jul. 18, 2017", 18 pgs.
"European Application Serial No. 14883581.2, Extended European Search Report dated Sep. 29, 2017", 9 pgs.
"European Application Serial No. 14883772.7, Communication of European publication number and information on the application of Article 67(3) dated Dec. 7, 2016", 1 pg.
"European Application Serial No. 15809284.1, Extended European Search Report dated Feb. 2, 2018", 8 pgs.
"European Application Serial No. 16168650.6, Extended European Search Report dated Sep. 7, 2016", 12 pgs.
"European Application Serial No. 16168650.6, Response Filed Nov. 13, 2017 to Communication Pursuant to Article 94(3) EPC dated Aug. 2, 2017", 10 pgs.
"European Application Serial No. 17153414.2, Extended European Search Report dated May 3, 2017", 8 pgs.
"Further evaluation on outdoor Wi-Fi ; 11-13-0843-00-0hew-further-evaluation-on-0utdoor-Wi-Fi", W00kbong Lee (LG Electronics): IEEE SA Mentor; 11-13-0843-00-0HEW-Further-Evaluation-On-0utd00r-Wi-Fi, IEEE-SA Mentor, Piscataway, NJ USA, (Jul. 15, 2013), 18 pgs.
"HEW SG PHY Considerations for Outdoor Environment; 11-13-0536-00-0hew-hew-sg-phy-considerations-for-outdoor-environment", W00kbong Lee (LG Electronics): IEEE SA Mentor; 11-13-

(56) References Cited

OTHER PUBLICATIONS 0536-00-0HEW-HEW-SG-PHY-Considerations-For-Outdoor-Environment, IEEE-SA Mentor, Piscataway, NJ USA,, (May 13, 2013), 21 pgs.

"IEEE Standard for information technology—Telecommunications and information exchange between systems—Local and metropolitan area networks—Specific Requirements Part 11: Wireless LAN Medium Access Control (MAC) and Physical Layer (PHY) Specifications", IEEE Computer Society, (2009), 536 pgs.

"IEEE Standard for information technology—Telecommunications and information exchange between systems—Local and metropolitan area networks—Specific Requirements Part 11: Wireless LAN Medium Access Control (MAC) and Physical Layer (PHY) Specifications", IEEE Computer Society, (2013), 425 pgs.

"Indian Application Serial No. 201647013626, Voluntary Amendment filed Aug. 4, 2016", W/ English Translation, 15 pgs.

"Indian Application Serial No. 201647013653, Preliminary Amendment filed Aug. 8, 2016", W/ English Translation, 18 pgs.

"Indian Application Serial No. 201647039642, Preliminary Amendment filed Jan. 5, 2017", 5 pgs.

"International Application Serial No. PCT/CN2014/086532, International Search Report dated Dec. 17, 2014", 4 pgs.

"International Application Serial No. PCT/CN2014/086532, Written Opinion dated Dec. 17, 2014", 4 pgs.

"International Application Serial No. PCT/US2014/044881, International Preliminary Report on Patentability dated Sep. 9, 2016", 9 pgs.

"International Application Serial No. PCT/US2014/044881, International Search Report dated Nov. 24, 2014", 3 pgs.

"International Application Serial No. PCT/US2014/044881, Written Opinion dated Nov. 24, 2014", 7 pgs.

"International Application Serial No. PCT/US2014/053451, International Preliminary Report on Patentability dated Sep. 9, 2016", 6 pgs.

"International Application Serial No. PCT/US2014/053451, International Search Report dated Dec. 10, 2014", 3 pgs.

"International Application Serial No. PCT/US2014/053451, Written Opinion dated Dec. 10, 2014", 4 pgs.

"International Application Serial No. PCT/US2014/056819, International Preliminary Report on Patentability dated Jun. 2, 2016", 8 pgs.

"International Application Serial No. PCT/US2014/057751, International Preliminary Report on Patentability dated Jun. 2, 2016", 7 pgs.

"International Application Serial No. PCT/US2014/064350, International Preliminary Report on Patentability dated Jun. 2, 2016", 7 pgs.

"International Application Serial No. PCT/US2014/064509, International Preliminary Report on Patentability dated Jun. 2, 2016", 10 pgs.

"International Application Serial No. PCT/US2014/064599, International Preliminary Report on Patentability dated Jun. 2, 2016", 9 pgs.

"International Application Serial No. PCT/US2014/064599, International Search Report dated Feb. 26, 2015", 3 pgs.

"International Application Serial No. PCT/US2014/064599, Written Opinion dated Feb. 26, 2015", 7 pgs.

"International Application Serial No. PCT/US2014/064767, International Preliminary Report on Patentability dated Jun. 2, 2016", 10 pgs.

"International Application Serial No. PCT/US2014/064767, International Search Report dated Feb. 26, 2015", 8 pgs.

"International Application Serial No. PCT/US2014/064767, Written Opinion dated Feb. 26, 2015", 8 pgs.

"International Application Serial No. PCT/US2014/065166, International Preliminary Report on Patentability dated Jun. 2, 2016", 8 pgs.

"International Application Serial No. PCT/US2014/071942, International Preliminary Report on Patentability dated Feb. 2, 2017", 9 pgs.

"International Application Serial No. PCT/US2014/071942, International Search Report dated Apr. 17, 2015", 3 pgs.

"International Application Serial No. PCT/US2014/071942, Written Opinion dated Apr. 17, 2015", 7 pgs.

"International Application Serial No. PCT/US2015/024889, International Preliminary Report on Patentability dated Nov. 17, 2016", 13 pgs.

"International Application Serial No. PCT/US2015/024889, International Search Report dated Jun. 29, 2015", 3 pgs.

"International Application Serial No. PCT/US2015/024889, Written Opinion dated Jun. 29, 2015", 11pgs.

"International Application Serial No. PCT/US2015/035114, International Preliminary Report on Patentability dated Jan. 26, 2017", 10 pgs.

"International Application Serial No. PCT/US2015/035114, International Search Report dated Oct. 19, 2015", 3 pgs.

"International Application Serial No. PCT/US2015/035114, Written Opinion dated Oct. 19, 2015", 8 pgs.

"Part 11: Wireless LAN Medium Access Control (MAC) and Physical Layer (PHY) Specifications Part 1 of 2", IEEE Computer Society IEEE Std 802.11-2016 (Revision of IEEE Std 802.11-2012), (2016), 2000.

"Part 11: Wireless LAN Medium Access Control (MAC) and Physical Layer (PHY) Specifications Part 2 of 2", IEEE Computer Society IEEE Std 802.11-2016 (Revision of IEEE Std 802.11-2012), (2016), 1535.

"Taiwanese Application Serial No. 104101656, Office Action dated Mar. 7, 2017", With English Claims, 13 pgs.

"Taiwanese Application Serial No. 104101656, Office Action dated Mar. 21, 2016", W/ English Search Report, 7 pgs.

"Taiwanese Application Serial No. 104101656, Response Filed Sep. 6, 2017 to Office Action dated Mar. 7, 2017", (W/ English Claims), 56 pgs.

"Taiwanese Application Serial No. 104101656, Response filed Sep. 22, 2016 to Office Action dated Mar. 21, 2016", W/ English Claims, 43 pgs.

"Taiwanese Application Serial No. 104101789, Office Action dated Mar. 25, 2016", w/ English Claims, 18 pgs.

"Taiwanese Application Serial No. 104101789, Response filed Sep. 23, 2016 to Office Action dated Mar. 25, 2016", W/ English Translation of Claims, 61 pgs.

"Taiwanese Application Serial No. 104101790, Office Action dated Apr. 21, 2016", w/ English Claims, 12 pgs.

"Taiwanese Application Serial No. 104101790, Response filed Jul. 22, 2016 to Office Action dated Apr. 21, 2016", W/ English Claims, 10 pgs.

"Taiwanese Application Serial No. 104106272, Office Action dated Apr. 18, 2016", w/ English Claims, 15 pgs.

"Taiwanese Application Serial No. 104106272, Response filed Oct. 14, 2016 to Office Action dated Apr. 18, 2016", W/ English Claims, 45 pgs.

"Taiwanese Application Serial No. 104106275, Office Action dated Jun. 8, 2016", W/ Machine Translation, 5 pgs.

"Taiwanese Application Serial No. 104106275, Response filed Sep. 6, 2016 to Office Action dated Jun. 8, 2016", W/ English Claims, 80 pgs.

"Taiwanese Application Serial No. 104108807, Office Action dated May 26, 2016", W / English Search Report, 10 pgs.

"Taiwanese Application Serial No. 104108807, Response filed Nov. 25, 2016 Office Action dated May 26, 2016", W/ English Claims, 65 pgs.

"Taiwanese Application Serial No. 104110914, Office Action dated Mar. 28, 2016", w/ English Claims, 14 pgs.

"Taiwanese Application Serial No. 104110914, Response filed Sep. 10, 2016 to Office Action dated Mar. 28, 2016", W/ English Translation of Claims, 98 pgs.

"Taiwanese Application Serial No. 104113863, Office Action dated Jun. 6, 2016", No English Translation, 5 pgs.

"Taiwanese Application Serial No. 104113863, Response filed Aug. 30, 2016 to Office Action dated Jun. 6, 2016", W/ English Claims, 76 pgs.

"Taiwanese Application Serial No. 104117983, Office Action dated Jul. 28, 2016", Without English translation, 5 pgs.

(56) References Cited

OTHER PUBLICATIONS

"Taiwanese Application Serial No. 104117983, Response filed Jan. 16, 2017 to Office Action dated Jul. 28, 2016", (W/ English Translation), 87 pgs.
"Taiwanese Application Serial No. 104118345, Response filed Nov. 10, 2017 to Office Action dated May 10, 2017", (W/ English Claims), 68 pgs.
"Taiwanese Application Serial No. 104118345, Response filed Dec. 22, 2017 to Examiner Interview", (W/ English Claims), 52 pgs.
"Taiwanese Application Serial No. 104118504, Office Action dated Apr. 21, 2017", W/English Claims, 19 pgs.
"Taiwanese Application Serial No. 104118504, Office Action dated Jul. 21, 2016", W/ English Translation, 18 pgs.
"Taiwanese Application Serial No. 104118504, Response Filed Jul. 20, 2017 to Office Action dated Apr. 21, 2017", (W/ English Claims), 13 pgs.
"Taiwanese Application Serial No. 104118504, Response filed Oct. 18, 2016 to Office Action dated Jul. 21, 2016", W/ English Claims, 104 pgs.
"Taiwanese Application Serial No. 104122567, Office Action dated Jun. 27, 2017", (W/ Partial English Translation), 5 pgs.
"Taiwanese Application Serial No. 104122567, Office Action dated Oct. 13, 2016", W/ English Search Report, 8 pgs.
"Taiwanese Application Serial No. 104122567, Response Filed Apr. 13, 2017 to Office Action dated Oct. 13, 2016", (W/O English Claims), 9 pgs.
"Taiwanese Application Serial No. 104122567, Response Filed Dec. 22, 2017 to Office Action dated Jun. 27, 2017", (W/ English Claims), 134 pgs.
"Taiwanese Application Serial No. 105113980, Office Action dated Jul. 21, 2016", W/ English Claims, 18 pgs.
"Taiwanese Application Serial No. 105113980, Response filed Oct. 24, 2016 to Office Action dated Jul. 21, 2016", W/ English Claims, 80 pgs.
"Taiwanese Application Serial No. 105139522, Office Action dated Jan. 5, 2018", w/English Translation, 4 pgs.
Dave, Hedberg, et al., "Adjacent Channel Interference and Filtering for 56-carrier Signals ;11-04-1579-01 -000n-11 -4-1579-00-000n-aci-results", (Jan. 17, 2005), 1-26 pgs.
Jianhan, Liu, "Summary and Discussions of Proposals on Potential PHY Technologies in HEW 11-13-1375-01-0hew-summary-and-di scussions -of-proposals-on-potential-phy-technologies-in-hew", IEEE Draft; 11-13-1375-01-0HEW-Summary-and-Discussions-of-Proposals-on-Potential-PHY-Technologies-in-HEW, IEEE-SA Mentor, Piscataway, NJ USA, vol. 802.11 HEW, No. 1,, (Nov. 12, 2013), 1-15.
Raja, Banerjea, "A simplified STR Mechansim-MAC 11-14-0340-00-0hew-a-simplified-str-mechansim mac", IEEE Draft, 11-14-0340-00-OHEW-A-Simplified-STR-Mechan SIM-MAC, IEEE-Samentor, Piscataway, NJ USA, vol. 802.11HEW, (Mar. 16, 2014), 13 pgs.
Robert, Stacey, "Proposed Specification Framework for TGac; 11-09-0992-21-00ac-proposed-specification-framework for tgac", IEEE SA Mentor, 11-09-0992-21-00AC-Proposed-Specificationframework-for-Tgac,IEEE-Samentor, Piscataway, NJ USA, vol. 802.11ac,No. 21, (Dec. 9, 2009), 1-5 pgs.
Robert, Stacey, "Proposed TGac Draft Amendment ; 11-10-1361-13-00ac-proposed-tgac-draft-amendment", IEEE SA Mentor; 11-1O-1361-O3-00AC-Proposed-Tgac-Draft-Ame ndment, IEEE-SA Mentor, Piscataway, NJ USA (Jan. 19, 2011), 154 pgs.
Sean, Coffey, et al., "WWiSE complete proposal :presentation ; 11-4-0935-04-000n-wwise-complete-proposal presentation", 66 pgs.
Shahrnaz, Azizi, et al., "OFDMA Numerology and Structure", IEEE 802.11-15/0330r1, (Mar. 9, 2015), 11-30.
U.S. Appl. No. 14/338,137, filed Jul. 22, 2014, High-Efficiency WLAN (HEW) Master Station and Methods to Increase Information Bits for HEW Communcination, U.S. Pat. No. 9,325,463.
U.S. Appl. No. 15/263,864, filed Sep. 13, 2016, Wireless Apparatus for High-Efficiency (HE) Communication With Additional Subcarriers.

U.S. Appl. No. 15/052,600, filed Feb. 24, 2016, Wireless Apparatus for High-Efficiency (HE) Communication With Additional Subcarriers, U.S. Pat. No. 9,450,725.
U.S. Appl. No. 14/447,254, filed Jul. 30, 2014, Master Station and Method for High-Efficiency Wi-Fi (HEW) Communcation With a Minimum OFDMA Bandwidth Unit.
U.S. Appl. No. 14/341,055, filed Jul. 25, 2014, HEW Master Station and Method for Communicating in Accordance With a Scheduled OFDMA Technique on Secondary Channels, U.S. Pat. No. 9,853,784.
U.S. Appl. No. 14/458,000, filed Aug. 12, 2014, Master Station and Method for HEW Communication Using a Transmission Signaling Structure for a HEW Signal Field, U.S. Pat. No. 9,544,914.
U.S. Appl. No. 15/280,782, filed Sep. 29, 2016, Master Station and Method for HEW Communication Using a Transmission Signaling Structure for a HEW Signal Field, U.S. Pat. No. 9,867,210.
U.S. Appl. No. 15/394,069, filed Dec. 29, 2016, Master Station and Method for HEW Communication Using a Transmission Signaling Structure for a HEW Signal Field, U.S. Pat. No. 9,882,695.
U.S. Appl. No. 15/023,262, filed Mar. 18, 2016, Master Station and Method for HEW Communication With Signal Field Configuration for HEW OFDMA MU-MIMO Wideband Channel Operation.
U.S. Appl. No. 15/023,581, filed Mar. 21, 2016, Communication Station and Method for Communicating Using Minimum Bandwidth Units of Various Tone Allocation for OFDMA HEW, U.S. Pat. No. 9,838,961.
U.S. Appl. No. 15/025,634, filed Mar. 29, 2016, HEW Communication Station and Method for Communicating Longer Duration OFDM Symbols Using Minimum Bandwidth Units Having Tone Allocations.
U.S. Appl. No. 15/026,022, filed Mar. 30, 2016, Method, Apparatus, and Computer Readable Medium for Multi-User Scheduling in Wireless Local-Area Networks, U.S. Pat. No. 9,900,906.
U.S. Appl. No. 15/872,114, filed Jan. 16, 2018, Method, Apparatus, and Computer Readable Medium for Multi-User Scheduling in Wireless Local-Area Networks.
U.S. Appl. No. 14/573,912, filed Dec. 17, 2014, High-Efficiency (HE) Communication Station and Method for Communicating Longer Duration OFDM Symbols Within 40 MHZ and 80 MHZ Bandwidth Allocations, U.S. Pat. No. 9,680,603.
"European Application Serial No. 14864680.5, Communication Pursuant to Article 94(3) EPC dated May 11, 2018", 6 pgs.
"Taiwanese Application Serial No. 105139521, Office Action dated Apr. 27, 2018", w/English Translation, 4 pgs.
"Taiwanese Application Serial No. 105139522, Response filed May 11, 2018 to Office Action dated Jan. 5, 2018", W/ English Claims, 73 pgs.
Jinyoung, Chun, et al., "Legacy Support on HEW frame structure", IEEE, 11-13/1057r0, [Online] Retrieved from the Internet : <http//www.ieee802.org/11/Reports/hew_update.html>, (Sep. 16, 2013), 8 pgs.
"Chinese Application Serial No. 201480057161.2, Office Action dated May 31, 2018", w/ Concise StatementofRelevance,8 pgs.
"Chinese Application Serial No. 201480057311.X, Office Action dated Jul. 3, 2018", w/ English translation,21 pgs.
"European Application Serial No. 15809284.1, Response filed Aug. 20, 2018 to Extended European Search Report dated Feb. 2, 2018", 23 pgs.
"European Application Serial No. 18168206.3, Extended European Search Report dated Aug. 9, 2018", 9 pgs.
"Taiwanese Application Serial No. 105139521, Response filed Jul. 31, 2018to Office Action dated Apr. 27, 2018", W/ English Claims, 55 pgs.
Jinyoung, Chun, "Legacy support on HEWframe structure", LG Electronics, 11-13-1057-00-0, (Sep. 16, 2013), 8 pgs.
"(Discussion on potential techniques for HEW", IEEE 802.11-13/0871 rO), (Jul. 15, 2013), 13 pgs.
"U.S. Appl. No. 14/338,137, Notice of Allowance dated Nov. 25, 2015", 14 pgs.
"U.S. Appl. No. 14/341,055, Examiner Interview Summary dated Apr. 18, 2017", 3 pgs.
"U.S. Appl. No. 14/341,055, Non Final Office Action dated Nov. 14, 2016", 10 pgs.

(56) References Cited

OTHER PUBLICATIONS

"U.S. Appl. No. 14/341,055, Notice of Allowance dated Jul. 25, 2017", 10 pgs.
"U.S. Appl. No. 14/341,055, Response filed Apr. 14, 2017 to Non Final Office Action dated Nov. 14, 2016", 11 pgs.
"U.S. Appl. No. 14/458,000, Non Final Office Action dated Dec. 3, 2015", 16 pgs.
"U.S. Appl. No. 15/023,262, Examiner Interview Summary dated Oct. 11, 2017", 3 pgs.
"U.S. Appl. No. 15/023,262, Non Final Office Action dated Jul. 11, 2017", 14 pgs.
"U.S. Appl. No. 15/023,262, Response filed Oct. 10, 2017 to Non Final Office Action dated Jul. 11, 2017", 11 pgs.
"U.S. Appl. No. 15/026,022, Examiner Interview Summary dated Sep. 7, 2017", 3 pgs.
"U.S. Appl. No. 15/026,022, Non Final Office Action dated Jul. 18, 2017", 7 pgs.
"U.S. Appl. No. 15/026,022, Notice of Allowance dated Oct. 11, 2017", 5 pgs.
"U.S. Appl. No. 15/026,022, Preliminary Amendment dated Mar. 30, 2016", 9 pgs.
"U.S. Appl. No. 15/026,022, Response filed Sep. 7, 2017 to Non Final Office Action dated Jul. 18, 2017", 9 pgs.
"U.S. Appl. No. 15/263,864, Final Office Action dated Sep. 21, 2017", 19 pgs.
"U.S. Appl. No. 15/263,864, Response Filed Oct. 18, 2017 to Final Office Action dated Sep. 21, 2017", 11 pgs.
"U.S. Appl. No. 15/280,782, Corrected Notice of Allowance dated Sep. 27, 2017", 2 pgs.
"U.S. Appl. No. 15/280,782, Examiner Interview Summary dated Jul. 26, 2017", 3 pgs.
"U.S. Appl. No. 15/280,782, Notice of Allowance dated Sep. 8, 2017", 9 pgs.
"U.S. Appl. No. 15/280,782, Response filed Aug. 11, 2017 to Non Final Office Action dated May 12, 2017", 12 pgs.
"U.S. Appl. No. 15/394,069, Examiner Interview Summary dated Jul. 28, 2017", 3 pgs.
"U.S. Appl. No. 15/394,069, Notice of Allowance dated Sep. 22, 2017", 8 pgs.
"U.S. Appl. No. 15/394,069, Response filed Aug. 23, 2017 to Non Final Office Action dated May 26, 2017", 12 pgs.
"European Application No. 14864664.9, Extended European Search Report dated Aug. 14, 2017", 6 pgs.
"European Application Serial No. 14863133.6, Extended European Search Report dated Jul. 3, 2017", 10 pgs.
"European Application Serial No. 14863142.7, Extended European Search Report dated May 3, 2017", 7 pgs.
"European Application Serial No. 16168650.6, Communication Pursuant to Article 94(3) EPC dated Aug. 2, 2017", 5 pgs.
"Guard interval estimation considering switch time and propagation delay", R1-134362, 3GPP TSG RAN WG1 Meeting #74bis, (Oct. 2013).
"IEEE Standard 802.11b-1999", (1999), 1-89.
"Indian Application Serial No. 201647013652, Preliminary Amendment dated Aug. 4, 2016", 11 pgs.
"International Application Serial No. PCT/US2014/055996, International Preliminary Report on Patentability dated Jun. 2, 2016", 7 pgs.
"International Application Serial No. PCT/US2014/055996, International Search Report dated Dec. 17, 2014", 3 pgs.
"International Application Serial No. PCT/US2014/055996, Written Opinion dated Dec. 17, 2014", 5 pgs.
"International Application Serial No. PCT/US2014/056819, International Search Report dated Dec. 31, 2014", 3 pgs.
"International Application Serial No. PCT/US2014/056819, Written Opinion dated Dec. 31, 2014", 6 Pgs.
"International Application Serial No. PCT/US2014/057751, International Search Report dated Jan. 5, 2015", 3 pgs.
"International Application Serial No. PCT/US2014/057751, Written Opinion dated Jan. 5, 2015", 5 pgs.
"International Application Serial No. PCT/US2014/064340, International Preliminary Report on Patentability dated Jun. 2, 2016", 8 pgs.
"International Application Serial No. PCT/US2014/064340, International Search Report dated Feb. 16, 2015", 3 pgs.
"International Application Serial No. PCT/US2014/064340, Written Opinion dated Feb. 16, 2015", 6 pgs.
"International Application Serial No. PCT/US2014/064350, International Search Report dated Feb. 6, 2015", 4 pgs.
"International Application Serial No. PCT/US2014/064350, Written Opinion dated Feb. 6, 2015", 5 pgs.
"International Application Serial No. PCT/US2014/064509, International Search Report dated Feb. 11, 2015", 3 pgs.
"International Application Serial No. PCT/US2014/064509, Written Opinion dated Feb. 11, 2015", 8 pgs.
"International Application Serial No. PCT/US2014/065166, International Search Report dated Jan. 22, 2015", 3 pgs.
"International Application Serial No. PCT/US2014/065166, Written Opinion dated Jan. 22, 2015", 6 pgs.
"International Application Serial No. PCT/US2014/066133, International Preliminary Report on Patentability dated Jun. 2, 2016", 9 pgs.
"International Application Serial No. PCT/US2014/066133, International Search Report dated Feb. 24, 2015", 3 pgs.
"International Application Serial No. PCT/US2014/066133, Written Opinion dated Feb. 24, 2015", 7 pgs.
"International Application Serial No. PCT/US2015/035313, International Search Report dated Sep. 25, 2015", 4 pgs.
"International Application Serial No. PCT/US2015/035313, Written Opinion dated Sep. 25, 2015", 8 pgs.
"Taiwanese Application Serial No. 104108803, Office Action dated Jul. 1, 2016", w/English Claims, 16 pgs.
"Taiwanese Application Serial No. 104108803, Response filed Jan. 3, 2017 to Office Action dated Jul. 1, 2016", w/English Claims, 8 pgs.
"Taiwanese Application Serial No. 104118345, Office Action dated May 10, 2017", W/ English Translation, 9 pgs.
"VHDL Implementation of Reconfigurable Multimode Block Interleaver for OFDM Based WLAN", IJARECE, vol. 1, [Online]. Retrieved from the Internet: <http://ijarece.org/>, (Oct. 2012), 82-84 pgs.
Choi, Jinsoo, "Discussion on OFDMA in HEW", In: IEEE P802.11—High Efficiency WLAN Study Group, [Online] Retrieved from the internet: <http://www.ieee802.org/11/Reports/hew_update.htm>, (Nov. 11, 2013), 11 pgs.
Chun, Jinyoung, et al., "Legacy Support on HEW frame structure", IEEE 11-13/1057r0, (Sep. 1, 2013), 8 pgs.
Chun, Jinyoung, et al., "Uplink multi-user transmission", In: IEEE P802.11—High Efficiency WLAN Study Group, (Nov. 11, 2013), 18 pgs.
Hiertz, Guido R, et al., "Proposed direction and priorities for HEW", In: IEEE P802.11—High Efficiency WLAN Study Group, (Nov. 12, 2013), 17 pgs.
Hongyuan, Zhang, "11ah preamble for 2MHz and beyond ;11-11-1483-02-00ah-11ah-preamble-for-2mhzand-beyond", IEEE Draft; 11-11-1483-02-00AH-11AH-Preamble-for-2MHZAND-Beyond, IEEE-SA Mentor, Piscataway, NJ USA, vol. 802.11ah, No. 2, (01/162012), 1-24.
Jinsoo, Choi, "Discussion on OFDMA in HEW ; 11-13-1382-00-0hew-di scussion-on-ofdma-inhew", (LG Electronics): IEEE Draft; 11-13-1382-00-0HEW-Discussion-On-0FDMA-in-HEW, IEEE-SA Mentor, Piscataway, NJ USA vol. 802.11 HEW, (Nov. 12, 2013), 1-11.
Koskela, Timo, et al., "Discussion on Potential Techniques for HEW", In: IEEE P802.11—High Efficiency WLAN Study Group, [Online] Retrieved from the Internet : <http://www.ieee802.org/11/Reports/hew_update.html>, (Jul. 15, 2013), 13 pgs.
Oh, Jinhyung, et al., "Distributed implicit interference alignment in 802.11ac WLAN network", International Conference on ICT Convergence (ICTC), (Oct. 2013), 421-426.
Yunoki, Katsuo, et al., "Access Control Enhancement; 11-13-1073-01-0hew-access-control-enhancement", IEEE Draft; 11-13-1073-01-0HEW-Access-Control-Enhancement. IEEE-SA Mentor. Piscataway.

(56) References Cited

OTHER PUBLICATIONS

NJ USA. vol. 802.11 HEW. No. 1, [Online]. Retrieved from the Internet: <https://mentor.ieee.org/802.11/documents?is_dcn=1073>, (Sep. 18, 2013), 1-9.
"U.S. Appl. No. 15/025,634, Final Office Action dated Apr. 20, 2018", 20 pgs.
"U.S. Appl. No. 15/263,864, Corrected Notice of Allowance dated Feb. 21, 2018", 5 pgs.
"U.S. Appl. No. 15/263,864, Corrected Notice of Allowance dated Apr. 13, 2018", 5 pgs.
"European Application No. 14864664.9, Response filed Feb. 27, 2018 to Extended European Search Report dated Aug. 14, 2017", 13 pgs.
"European Application Serial No. 14864107.9, Response Filed Feb. 16, 2018 to Extended European Search Report dated Jul. 27, 2017", 16 pgs.
"Indian Application Serial No. 201647013652, Voluntary Amendment filed on Mar. 29, 2018", 16 pgs.
"Taiwanese Application Serial No. 104118345, Response filed Mar. 1, 2018 to Examiner Interview", (W/ English Claims), 59 pgs.
"Taiwanese Application Serial No. 104118345, Voluntary Amendment filed on Apr. 3, 2018", W/ English Claims, 12 pgs.
"U.S. Appl. No. 15/263,864, Corrected Notice of Allowability dated Sep. 7, 2018", 5 pgs.
"U.S. Appl. No. 15/263,864, Corrected Notice of Allowability dated Dec. 13, 2018", 5 pgs.
"Chinese Application Serial No. 201480056246.9, Office Action dated Sep. 29, 2018", W/ English Translation, 23 pgs.
"Chinese Application Serial No. 201480056258.1, Office Action dated Aug. 28, 2018", w/ English Translation, 31 pgs.
"Chinese Application Serial No. 201480057442.8, Office Action dated Jul. 4, 2018", W/ English Translation, 20 pgs.
"Chinese Application Serial No. 201480057442.8, Response filed Nov. 19, 2018 to Office Action dated Jul. 4, 2018", W/ English Claims, 13 pgs.
"Chinese Application Serial No. 201480057471.4, Office Action dated Jul. 25, 2018", W/ English Translation, 15 pgs.
"Chinese Application Serial No. 201480057471.4, Response filed Dec. 3, 2018 to Office Action dated Jul. 25, 2018", W/ English Claims, 21 pgs.
"Chinese Application Serial No. 201480072813.X, Office Action dated Sep. 28, 2018", w/ English translation, 23 pgs.
"Chinese Application Serial No. 201610364994.4, Office Action dated Sep. 28, 2018", W/ English translation, 14 pgs.
AIRGO, "", WWiSE IEEE 802.11n Proposal, (Nov. 16, 2004), 45 pgs.
"Chinese Application Serial No. 201480056188.X, Office Action dated Feb. 1, 2019", w English Translation, 17 pgs.
"Chinese Application Serial No. 201480072813.X, Response filed Feb. 13, 2019 to Office Action dated Sep. 28, 2018", w English Claims, 35 pgs.
"Chinese Application Serial No. 201610364994.4, Response filed Feb. 13, 2019 to Office Action dated Sep. 28, 2018", w English Claims, 24 pgs.
"Chinese Application Serial No. 201580025791.6, Office Action dated Dec. 27, 2018", w o English translation, 9 pgs.
"Chinese Application Serial No. 201480056246.9, Response filed Feb. 14, 2019 to Office Action dated Sep. 29, 2018", w English Claims, 19 pgs.

\* cited by examiner

HEW MASTER STATION AND METHOD FOR COMMUNICATING IN ACCORDANCE WITH A SCHEDULED OFDMA TECHNIQUE ON SECONDARY CHANNELS

PRIORITY CLAIMS

This application is a continuation of U.S. patent application Ser. No. 14/341,055, filed on Jul. 25, 2014, which claims priority under 35 U.S.C. 119 to the following United States Provisional patent applications:
Ser. No. 61/906,059 filed Nov. 19, 2013,
Ser. No. 61/973,376 filed Apr. 1, 2014,
Ser. No. 61/976,951 filed Apr. 8, 2014,
Ser. No. 61/986,256 filed Apr. 30, 2014,
Ser. No. 61/986,250 filed Apr. 30, 2014,
Ser. No. 61/991,730 filed May 12, 2014,
Ser. No. 62/013,869 filed Jun. 18, 2014, and
Ser. No. 62/024,801 filed Jul. 15, 2014
which are all incorporated herein by reference in their entireties.

TECHNICAL FIELD

Embodiments pertain to wireless networks. Some embodiments relate to wireless local area networks (WLANs) and Wi-Fi networks including networks operating in accordance with one of the IEEE 802.11 standards, such as the IEEE 802.11ac standard or the IEEE 802.11ax SIG (named DensiFi). Some embodiments relate to high-efficiency wireless or high-efficiency WLAN (HEW) communications. Some embodiments relate to multi-user multiple-input multiple-output (MU-MIMO) and orthogonal frequency division multiple access (OFDMA) communications.

BACKGROUND

IEEE 802.11ax, referred to as High Efficiency WLAN (HEW), is a successor to IEEE 802.11ac standard and is intended to increase the efficiency of wireless local-area networks (WLANs). HEW's goal is to provide up to four-times or more the throughput of IEEE 802.11ac standard. HEW may be particularly suitable in high-density hotspot and cellular offloading scenarios with many devices competing for the wireless medium may have low to moderate data rate requirements. The Wi-Fi standards have evolved from IEEE 802.11b to IEEE 802.11g/a to IEEE 802.11n to IEEE 802.11ac and now to IEEE 802.11ax. In each evolution of these standards, there were mechanisms to afford coexistence with the previous standard. For HEW, the same requirement exists for coexistence with these legacy standards. One issue with HEW is the efficient allocation and use of bandwidth. In certain situations, bandwidth may go unused to the operation of legacy devices on only a portion of the available bandwidth.

Thus there are general needs for systems and methods that that allow HEW devices to coexist with legacy devices. There are also general needs for systems and methods that that allow HEW devices to coexist with legacy devices and more efficiently allocate and use the available bandwidth.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
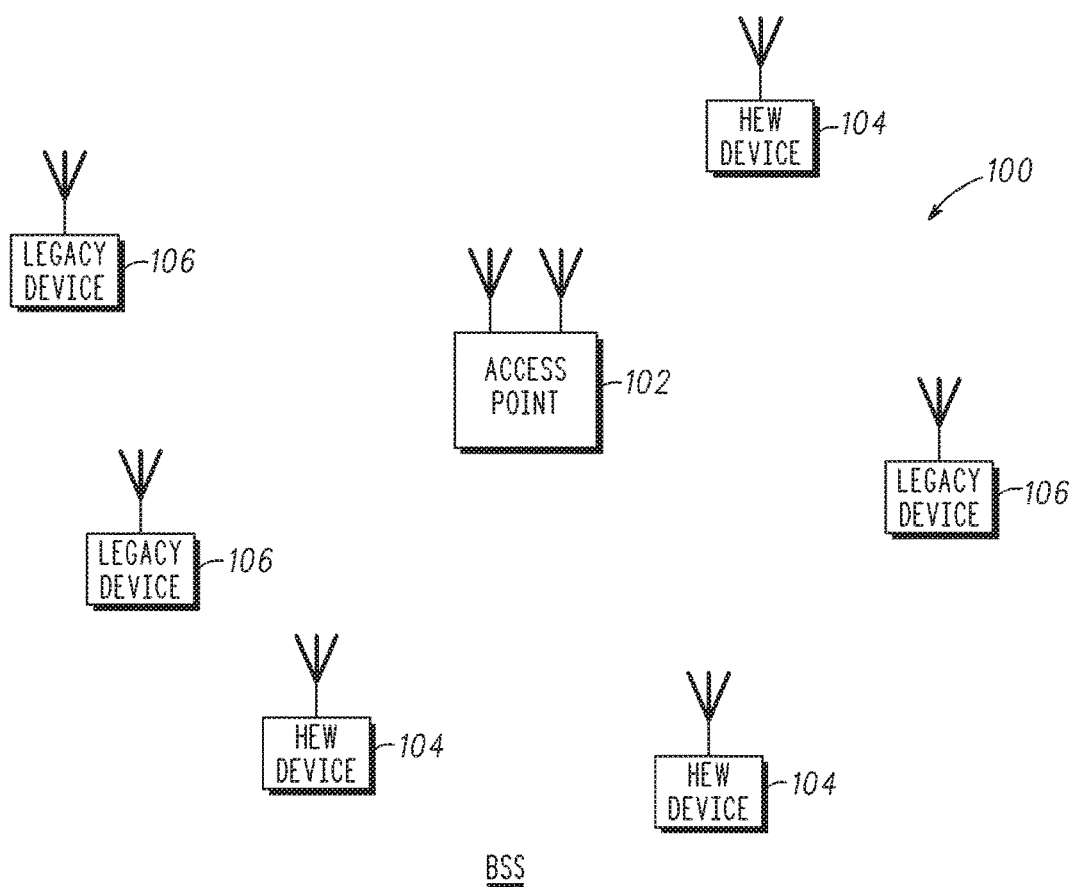
FIG. 1 illustrates a wireless network in accordance with some embodiments.

FIG. 1 illustrates a wireless network in accordance with some embodiments. The wireless network may comprise a basis service set (BSS) 100 that may include an access point (AP) 102, a plurality of HEW (e.g., IEEE 802.11ax) devices 104 and a plurality of legacy (e.g., IEEE 802.11n/ac) devices 106. The BSS 100 may operate on a primary channel and one or more secondary channels. In accordance with embodiments, the access point 102 may communicate with one or more of the HEW devices 104 on one or more of the secondary channels in accordance with a scheduled multiple access communication technique when the primary channel 202 is utilized for communication with one or more of the legacy devices 106. In these embodiments, when communications with a legacy device 106 in accordance with legacy IEEE 802.11n and IEEE 802.11ac techniques take place only on the primary channel, simultaneous use of any of secondary channels may be prohibited based on the legacy IEEE 802.11 standards allowing that bandwidth to go to unused and be wasted. Embodiments disclosed herein may take advantage of the unused wasted bandwidth on the secondary channels by allowing HEW devices 104 to communicate within that bandwidth. This allows legacy devices 106 to share part of the large bandwidth at the same time allocation with HEW devices 104. These embodiments are discussed in more detail below. In some embodiments, the access point 102 may be configured to communicate concurrently with one or more of the HEW devices 104 on one or more of the secondary channels and a legacy device 106 utilizing only the primary channel and not utilizing any of the secondary channels. These embodiments are also discussed in more detail below.

In accordance with some HEW embodiments, the access point 102 may operate as a master station which may be arranged to contend for a wireless medium (e.g., during a contention period) to receive exclusive control of the medium for an HEW control period (i.e., a transmission opportunity (TXOP)). The access point 102 may transmit an HEW master-sync transmission at the beginning of the HEW control period. During the HEW control period, HEW devices 104 may communicate with the access point 102 in accordance with a non-contention based multiple access technique. This is unlike conventional Wi-Fi communications in which devices communicate in accordance with a contention-based communication technique, rather than a multiple access technique. During the HEW control period, the access point 102 may communicate with HEW devices 104 using one or more HEW frames. During the HEW control period, legacy devices 106 refrain from communicating. In some embodiments, the master-sync transmission may be referred to as an HEW control and schedule transmission.

In some embodiments, the multiple-access technique used during the HEW control period may be non-contention based technique such as a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

In some embodiments, the SDMA technique may be used along with OFDMA for communicating with scheduled HEW devices during the HEW control period. For example, in a 10 MHz OFDMA allocation, the access point may schedule spatial multiplexing of two uplink user's transmissions.

The access point 102 may also communicate with legacy devices 106 in accordance with legacy IEEE 802.11 communication techniques. In some embodiments, the access point 102 may also be configured to communicate with HEW devices 104 outside the HEW control period in accordance with legacy IEEE 802.11 communication techniques, although this is not a requirement. Legacy IEEE 802.11 communication techniques may refer to any IEEE 802.11 communication technique prior to IEEE 802.11ax.

In some embodiments, an HEW frame may be configurable to have the same bandwidth and the bandwidth may be one of 20 MHz, 40 MHz, or 80 MHz contiguous bandwidths or an 80+80 MHz (160 MHz) non-contiguous bandwidth. In some embodiments, a 320 MHz contiguous bandwidth may be used. In some embodiments, bandwidths of 1 MHz, 1.25 MHz, 2.5 MHz, 5 MHz and 10 MHz or a combination thereof may also be used. In these embodiments, an HEW frame may be configured for transmitting a number of spatial streams.

Figure 2:
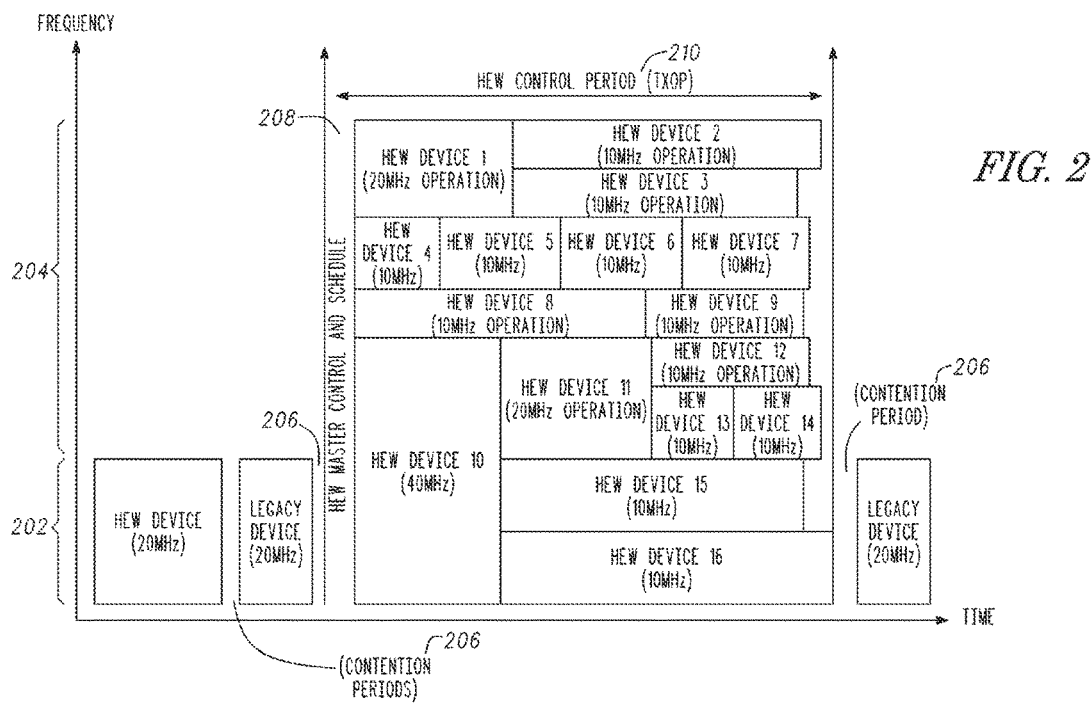
FIG. 2 illustrates the time-frequency space during which HEW communications may take place in accordance with some embodiments.

FIG. 2 illustrates the time-frequency space during which HEW network communications may take place in accordance with some embodiments. The access point 102 (FIG. 1) may be arranged to contend for a wireless medium during a contention period 206 to receive exclusive control of the medium for an HEW control period 210. The access point 102 may also be arranged to transmit an HEW control and schedule transmission 208 at the beginning of the HEW control period 210. As mentioned above, the HEW control and schedule transmission 208 may include at least a schedule indicating channel resources for at least some of the communications with the HEW devices 104 (FIG. 1) during the HEW control period 208.

In these embodiments, the channel resources indicated in the HEW control and schedule transmission 208 comprise subspaces within the channel bandwidth. The subspaces may comprise time-frequency resources for HEW channels having HEW channel bandwidths. In these embodiments, the access point 102 may also be arranged to communicate with each scheduled HEW device 104 on one of the HEW channels within the indicated channel resources during the HEW control period 210.

In these embodiments, the channel resources that are indicated may comprise frequency bandwidth and time-slot information. Each subspace may be defined by a particular frequency band within one or more legacy channel bandwidths (e.g., 20 MHz) and defined as particular OFDM symbols or time slots.

In the example illustrated in FIG. 2, an HEW OFDMA allocation uses HEW channels with a 10 MHz minimum channel bandwidth. In this example, a total of sixteen HEW devices are allocated channel resources within one of the subspaces. In the example illustrated in FIG. 2, legacy devices 106 (FIG. 1) are illustrated as communicating on a 20 MHz primary channel 202 outside the HEW control period 210 and a wideband channel bandwidth is illustrated as an 80 MHz bandwidth comprising four 20 MHz legacy channels. The HEW channels are illustrated as being aligned with one or more 20 MHz legacy channels. In these embodiments, transmissions on any of the HEW channels are configured to have symbol times aligned within each legacy channel at least on the legacy portion of the HEW preamble. Accordingly, when a legacy device 106 detects transmissions on a legacy channel using a signal-detection technique, the transmissions will appear as a legacy transmission causing a legacy device 106 to defer transmission. Other minimum channel bandwidths for OFDMA communications are discussed below.

In some embodiments, the symbol duration for OFDMA transmissions (e.g., in accordance with IEEE 802.11ax) may be different from the legacy symbol duration. In these embodiments, the transmissions on any of the OFDMA HEW channels may be configured to have symbol times aligned within each legacy channel only for the legacy portion of the HEW preamble.

In the embodiments illustrated in FIG. 2, HEW communications are illustrated as taking place across the entire channel bandwidth during the HEW control period 210 and legacy communications take place outside the HEW control period 210. In these embodiments, HEW communications may take place concurrently on the primary channel 202 and one or more secondary channels 204. Other embodiments disclosed herein provide for HEW communications to take place concurrently with legacy communications. These embodiments are described in more detail below.

Figure 3:
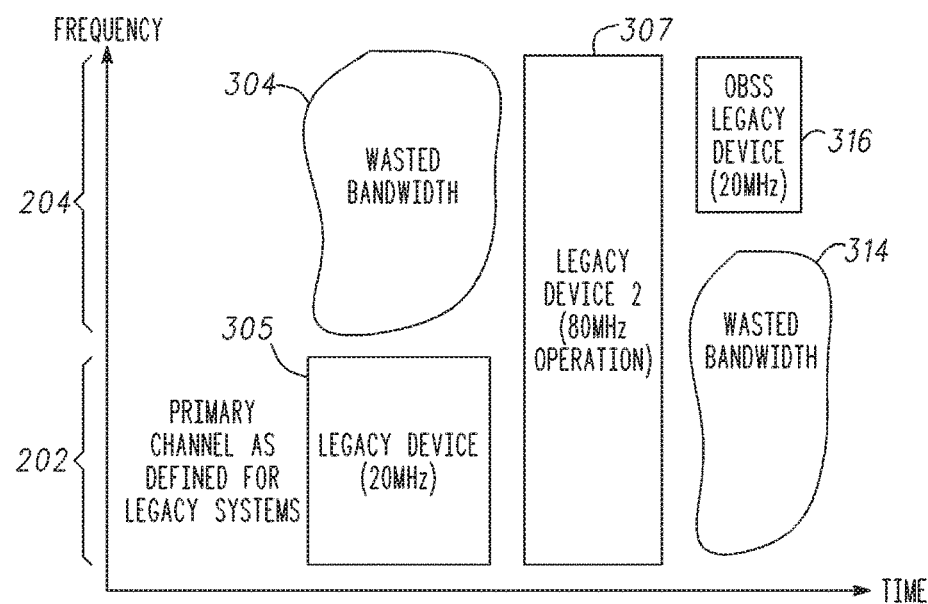
FIG. 3 illustrates the time-frequency space during which legacy communications may take place.

FIG. 3 illustrates the time-frequency space during which legacy communications may take place. FIG. 3 illustrates an example of an 80 MHz bandwidth comprising a 20 MHz primary channel 202 and three 20 MHz secondary channels 204 within the remaining bandwidth. Legacy devices 106 (FIG. 1) may be configured for 20 MHz operation 305 on the primary channel as well as wider bandwidth operation 307 (e.g., 80 MHz) on the primary channel 202 and one or more of the secondary channels 204. One issue is that when a legacy device operates on the primary channel 202, the bandwidth 304 of secondary channels may go unused and may be wasted. A similar situation occurs when another BSS utilizes a different primary channel 316 causing the bandwidth 314 of the other channels to go unused.

One reason that bandwidth 304 and bandwidth 314 go unused is the impact of interference from legacy operation in the adjacent primary channel. Embodiments described in more detail below allow for use of this unused bandwidth by HEW devices 104. In these embodiments, the HEW devices 104 may include a more stringent spectral mask and more stringent filtering and oscillator requirements to reduce the impact of adjacent channel interference and to enable OFDMA operation in adjacent channels. Legacy devices 106 are not required to meet these more stringent requirements, however the more stringent spectral mask used by the HEW devices 104 reduces the impact on legacy devices 106 and allows legacy devices 106 to communicate on adjacent channels without being affected by OFDMA communications by HEW devices 104 on adjacent channels. Therefore, legacy devices 106 do not need communicate at a low modulation and coding scheme (MCS) when HEW devices 104 are communicating in adjacent channels. Furthermore, due to more stringent spectral mask used by the HEW devices 104, the legacy signal field (L-SIG) will be able to be reliably read by legacy devices 106 allowing the legacy devices 106 to determine the transmission time of HEW communications on adjacent channels and/or on the primary channel and to defer their transmissions accordingly.

Figure 4:
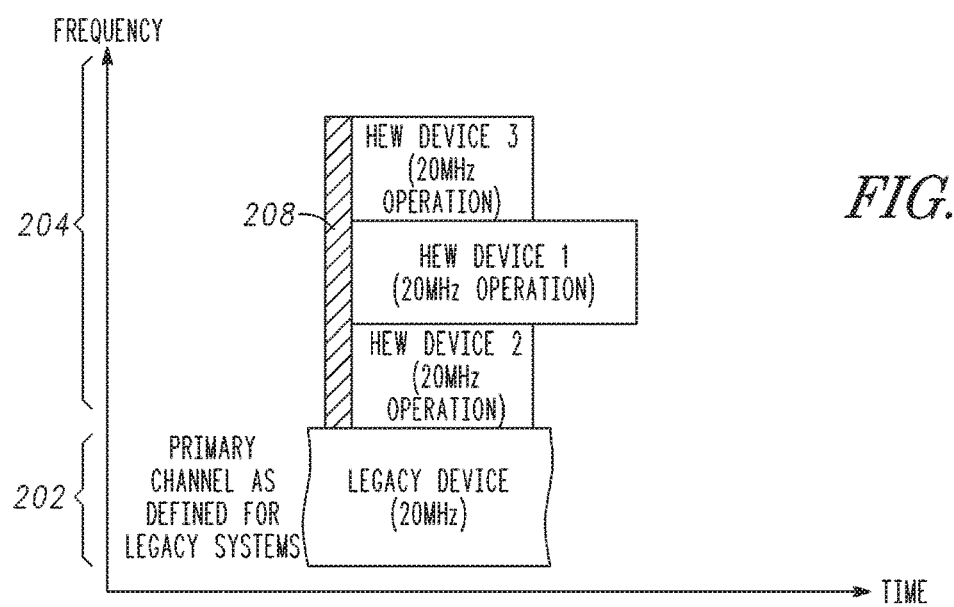
FIG. 4 illustrates the time-frequency space during which HEW communications and legacy communications may take place in accordance with some embodiments.

FIG. 4 illustrates the time-frequency space during which HEW communications and legacy communications may take place in accordance with some embodiments. As illustrated in FIG. 4, HEW device communications may take place on one or more secondary channels 204 while legacy device communications may take place on the primary channel 202. In the example illustrated in FIG. 4, three HEW devices 104 each may communicate on one of the 20 MHz secondary channels 204 after an HEW control and schedule transmission 208 while a single legacy device communicates with the access point 102 on the primary channel 202.

Figure 5:
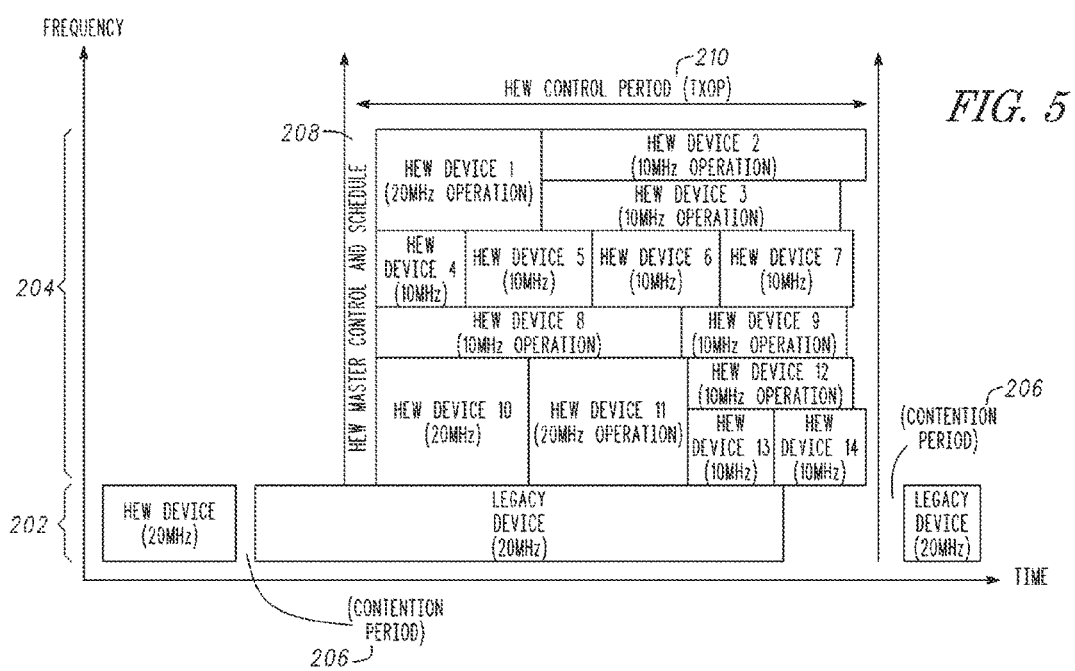
FIG. 5 illustrates the time-frequency space during which HEW communications and legacy communications may take place in accordance with some other embodiments.

FIG. 5 illustrates the time-frequency space during which HEW communications and legacy communications may take place in accordance with some other embodiments. As illustrated in FIG. 5, HEW device communications may take place on one or more secondary channels 204 while legacy device communications may take place on the primary channel 202. In the example illustrated in FIG. 5, fourteen HEW devices communicate with the bandwidth of the secondary channels 204 after an HEW control and schedule transmission 208 while a single legacy device communicates with the access point 102 on the primary channel 202. In this example, the HEW allocation uses HEW channels with a 10 MHz minimum channel bandwidth. In some embodiments, smaller HEW OFDMA bandwidth allocations (e.g., 5 MHz, 2.5 MHz, 1.25 MHz and 1 MHz) may be used. In some embodiments, HEW OFDMA bandwidth allocations may comprise 4.375 MHz channels that utilize 14 subcarriers with a 64 point FFT size. In other embodiments, HEW OFDMA communications may utilize 14 subcarriers with larger FFT sizes, such as a 256 point FFT (e.g., for embodiments in which the bandwidth allocation is 1 to 1.25 MHz) although the scope of the embodiments is not limited in this respect.

In the example illustrated in FIG. 5, communications with HEW devices 104 take place during the HEW control period 210 during which the access point 102 operating as a master station may have obtained a TXOP on the secondary channels 204. Communications with HEW devices 104 during the HEW control period 210 may comprise uplink communications or downlink communications.

In accordance with some embodiments, the access point 102 may communicate with one or more of the HEW devices 104 on one or more of the secondary channels 204 in accordance with a scheduled OFDMA communication technique when the primary channel 202 is utilized for communication with one or more of the legacy devices 106. The access point 102 may refrain from communicating with the legacy device 106 on any of the secondary channels 104 when concurrently communicating with the one or more of the HEW devices 104 on one or more of the secondary channels 204 and the legacy device 106 on the primary channel 202. In these embodiments, the access point 102 may be configured to only use the primary channel 202 and not utilize any of the secondary channels 204 for communicating with a legacy device 106 when the access point 102 is concurrently communicating with one or more of the HEW devices 104 on one or more of the secondary channels 204.

In some embodiments, the access point 102 may be configurable to: communicate with the one or more of the HEW devices 104 on one or more of the secondary channels 204 in accordance with a non-contention based multiple-access communication technique while concurrently communicating with the legacy device 106 utilizing only the primary channel 202 in accordance with a contention-based communication technique. In these embodiments, the access point 102 may operate as a master station when communicating with the HEW devices 104.

In some embodiments, the non-contention based multiple-access communication technique used for communicating with the one or more HEW devices 104 may be a scheduled OFDMA technique. The contention-based communication technique may include a carrier sense multiple access/collision avoidance (CSMA/CA) technique, a carrier sense multiple access/collision detection (CSMA/CD) technique, and an enhanced-CSMA/CA (e-CSMA/CA) technique.

In these embodiments, the access point 102 may be configurable to communicate with the legacy devices 106 using the primary channel 202 and up to one or more secondary channels 204 in accordance with legacy (i.e., IEEE 802.11n/ac) communication techniques. The access point 102 may also be configurable to communicate with the legacy devices 106 in accordance with legacy (i.e., IEEE 802.11b and IEEE 802.11g/a) communication techniques. In these embodiments, the access point 102 may be configurable to communicate with the HEW devices 104 within bandwidth occupied by the primary and secondary channels in accordance with an HEW (i.e., IEEE 802.11ax) technique.

In these embodiments, when communications with a legacy device 106 in accordance with legacy IEEE 802.11 ln and IEEE 802.11 ac techniques take place only on the 20 MHz primary channel, simultaneous use of any of secondary channels 204 may be prohibited based on the legacy 802.11 standards allowing that bandwidth to go to unused and be wasted. Embodiments disclosed herein may take advantage of the unused wasted bandwidth 304, 314 (see FIG. 3) on the secondary channels 204 by allowing HEW devices 104 to communicate within that bandwidth. This allows legacy devices 106 to share part of the large bandwidth at the same time allocation with HEW devices 104.

In some embodiments, when the access point 102 may configure its transmissions so as not to risk failing to receive uplink data from a legacy device 106 during the transmission of downlink data to the one or more HEW devices 104. In these embodiments, the access point 102 may either a transmit mode or a receive mode. These embodiments are discussed in reference to FIG. 6 and FIG. 7 below.

Figure 6:
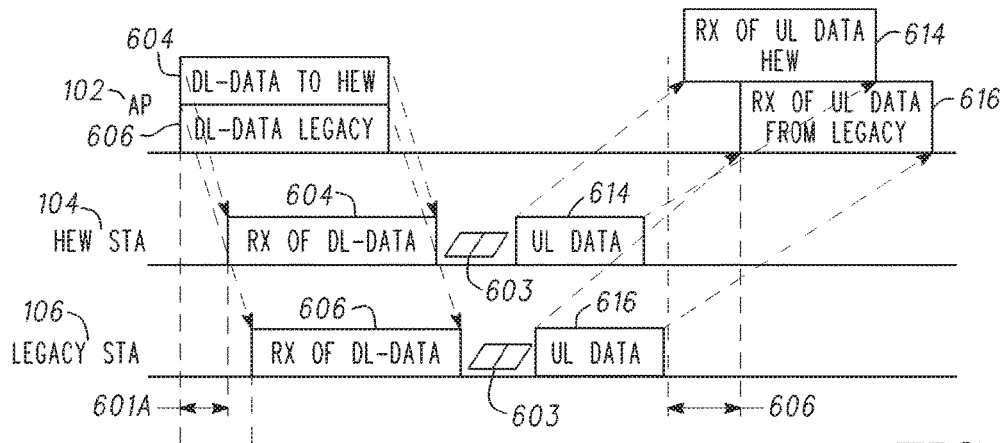
FIG. 6 illustrates concurrent HEW communications and legacy communications in accordance with some other embodiments.

FIG. 6 illustrates concurrent HEW communications and legacy communications in accordance with some other embodiments. In these embodiments, during transmit mode, the access point 102 may be configured to concurrently transmit HEW downlink data 604 to the one or more HEW devices 104 on the one or more of the secondary channels 204, and legacy downlink data 606 to the legacy device 106 on the primary channel 202. During receive mode, the access point 102 may be configured to concurrently receive HEW uplink data 614 from the one or more HEW devices 104 on the one or more of the secondary channels 204, and legacy uplink data 616 from the legacy device 106 on the primary channel 202. A relative short interframe spacing (SIFS) 603 may be provided between receipt of downlink data and transmission of uplink data. In these embodiments, the access point 102 may be either in receive mode or in transmit mode (but not both) for all channels to allow from simultaneous transmission or simultaneous reception on any channel.

As further illustrated in FIG. 6, a difference in propagation delay and timing acquisition may exist between receipt of downlink data 604 by HEW devices and downlink data 606 by legacy devices 106 (see reference numbers 601A and 601B) resulting in receipt of downlink data at different times. Furthermore, a difference in propagation delay and SIFS accuracy, for example, may result in receipt of uplink data 614 and 616 by the access point 102 at different times (see reference number 606).

In the example situation illustrated in FIG. 6, since the HEW downlink data 604 is transmitted to the one or more HEW devices 104 currently with transmission of the legacy downlink data 606 to the legacy device 106, data is received from both HEW devices 104 and legacy devices concurrently. In this situation, the access point 102 may be able to receive the HEW uplink data 614 from the one or more HEW devices 104 on the one or more of the secondary channels 204 concurrently with the legacy uplink data 616 from the legacy device 106 on the primary channel 202, since the access point 102 may be in receive mode. This may not be the case if the HEW downlink data 604 is transmitted to the one or more HEW devices 104 non-concurrently with transmission of the legacy downlink data 606 to the legacy device 106.

Figure 7:
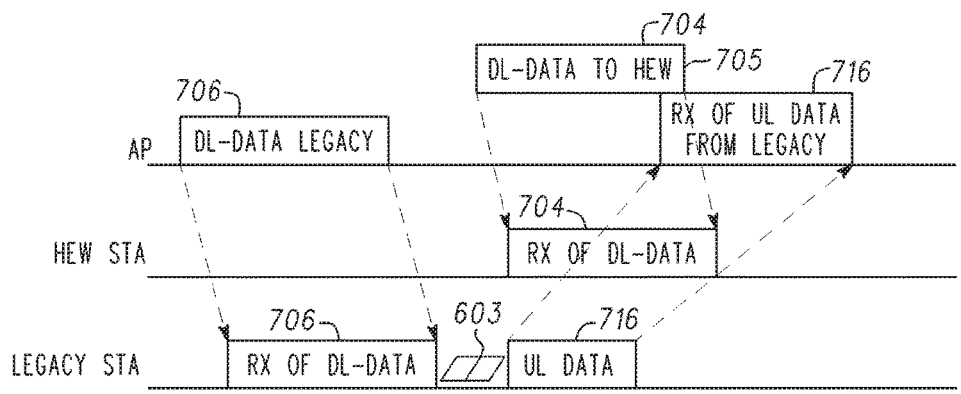
FIG. 7 illustrates non-concurrent HEW communications and legacy communications.

FIG. 7 illustrates non-concurrent HEW communications and legacy communications. In this illustration, HEW downlink data 704 and legacy downlink data 706 may be transmitted at different times and as a result the access point 102 may fail to receive uplink data 716 (see reference number 705) from a legacy device 106 during the transmission of the downlink data 704 to the one or more HEW devices 104 (i.e., because the access point 102 would be in transmit mode, not receive mode.)

In accordance with embodiments, the access point 102 may be configured to refrain from transmitting the HEW downlink data 704 to the one or more HEW devices 104 on the one or more secondary channels 204 without a concurrent transmission of the legacy downlink data 706 to the legacy device 106 on the primary channel 202. In these embodiments, by refraining from transmitting the HEW downlink data 704 on the one or more secondary channels 204 without a concurrent transmission of the legacy downlink data 706 on the primary channel 202, the access point 102 does not risk failing to receive uplink data 716 from a legacy device 106 during the transmission of downlink data 704 to the one or more HEW devices 104.

In accordance with some embodiments, the access point 102 may be configured to refrain from transmitting the HEW downlink data 704 to the one or more HEW devices 104 on the one or more secondary channels 204 without a concurrent transmission of the legacy downlink data to the legacy device 106 on the primary channel when an upcoming uplink packet is predicted to be received from a legacy station on the primary channel. For example, the access point 102 may expect to receive an ACK on the primary channel 202 from a legacy station 106.

In some embodiments, the access point 102 may contend for bandwidth that includes the primary channel and one or more of the secondary channels during a contention period 206. When a transmission opportunity (TXOP) is obtained on the one or more of the secondary channels 204 but not obtained on the primary channel 202 (e.g., the primary channel may therefore be busy), the access point 102 may refrain from communicating on the one or more of the secondary channels 204 with the one or more HEW devices 104 at least when the access point expects to receive packets from legacy within the TXOP unless the access point is concurrently transmitting to the legacy device. In these embodiments, the access point 102 may communicate on the one or more of the secondary channels 204 with the one or more HEW devices 104 only when the access point 102 is transmitting to a legacy device 106. Thus, the risk of the access point 102 failing to receive uplink data 716 (see reference number 705) from a legacy device 106 during the transmission of HEW downlink data 704 to the one or more HEW devices 104 is reduced or eliminated. In some embodiments, the access point 102 may contend for bandwidth in accordance with a CSMA-CA protocol to obtain a TXOP.

In some embodiments, when the primary channel 202 is busy, the access point 102 may be configured to contend for bandwidth on the one or more of the secondary channels 204 during a contention period 206. When a TXOP is obtained on the one or more of the secondary channels 204, the access point 102 is configured to communicate with at least some of the HEW devices 104 in accordance with a scheduled OFDMA technique on the one or more of the secondary channels 204 during the TXOP when the primary channel is busy. In these embodiments, the primary channel 202 may be busy because the access point 102 is transmitting to a legacy device 106 of BSS 100. The primary channel 202 may also be busy because of transmissions of another BSS using the same channel as primary channel 202 of the BSS 100. For example, a legacy device of another BSS may transmitting to the access point of the other BSS using the same channel as primary channel 202 of the BSS 100. In both of these cases, the L-SIG that was transmitted on the primary channel 202 by the transmitting device would cause the network allocation vector (NAV) of other devices on either BSS to be set designating the primary channel 202 as busy. One or more of the secondary channels may also be busy, for example, when being used as primary channel of another BSS, as indicated by reference designator 316 in FIG. 3.

In these embodiments, the access point 102 may be configured to independently but concurrently communicate with one of the legacy devices 106 on the primary channel 202 in accordance with a contention-based communication technique and communicate with at least some of the HEW devices 104 on the one or more secondary channels 204 in accordance with a non-contention based multiple-access communication technique.

In some embodiments, when a TXOP is obtained on the one or more of the secondary channels 204 but not obtained on the primary channel 202, the access point 102 may transmit an HEW control transmission 208 on the one or more secondary channels 204 at the beginning of the HEW control period 210 to schedule communications with at least some of the HEW devices 104 during the HEW control period 210 on one or more of the secondary channels 204 and either: transmit downlink data to the scheduled HEW devices during the HEW control period 210 on the one or more secondary channels 204 based on scheduling information provided to the scheduled HEW devices 104 in the HEW control transmission 208, or receive uplink data from the scheduled HEW devices during the HEW control period 210 on the one or more secondary channels 204 based on the scheduling information provided to the scheduled HEW devices 104 in the HEW control transmission 208. In these embodiments, the access point 102 may concurrently transmit to the legacy device 106 on the primary channel 202 during the HEW control period 210 when transmit downlink data to the scheduled HEW devices 104, or concurrently receive from the legacy device 106 on the primary channel 202 during the HEW control period 210 when receiving uplink data from the scheduled HEW devices 104.

In some embodiments, the HEW control transmission 208 may include at least a schedule indicating channel resources for communications with the HEW devices 104 during the HEW control period 210 in accordance with the scheduled OFDMA technique. The channel resources may comprise subspaces for HEW channels having HEW channel bandwidths within the secondary channels. The HEW channel bandwidths may comprise one or more of 10 MHz, 5 MHz, 2.5 MHz, 1.25 MHz, and 1 MHz sub-portions of a 20 MHz channel bandwidth to define respectively 10 MHz, 5 MHz, 2.5 MHz, 1.25 MHz, and 1 MHz HEW channels, and transmissions on the 10 MHz, 5 MHz, 2.5 MHz, and 1 MHz HEW channels are configured to have symbol times aligned within a 20 MHz channel. In some embodiments discussed above, the HEW channel bandwidths may comprise 4.375 MHz channels that utilize fourteen subcarriers, although the scope of the embodiments is not limited in this respect.

In some embodiments, the primary channel 202 may comprise a 20 MHz channel and the secondary channels 204 include one or more of 20 MHz channels. In these embodiments, bandwidths of 40 MHz, 80 MHz and 160 MHz may be provided through the use of the primary channel 202 and one or more secondary channels 204. In some embodiments, a 320 MHz bandwidth may be provided.

In some embodiments, the primary channel 202 may comprise a 40 MHz channel and the secondary channels 204 include a 40 MHz channel. In these embodiments, the primary channel 202 may comprise a 40 MHz channel and the secondary channels 204 may comprise a single 40 MHz channel to provide up to 80 MHz of bandwidth. In some other embodiments, the primary channel 202 may comprise an 80 MHz channel and the secondary channels 204 may comprise a single 80 MHz channel to provide up to 160 MHz of bandwidth.

Figure 8:
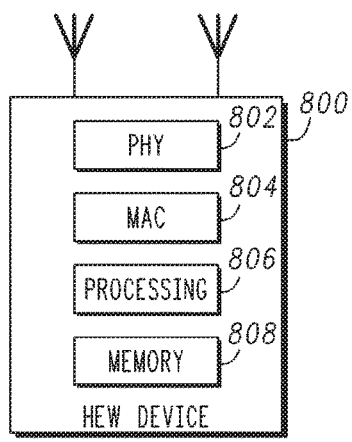
FIG. 8 illustrates a wireless communication device in accordance with some embodiments.

FIG. 8 illustrates a HEW device in accordance with some embodiments. HEW device 800 may be an HEW compliant device that may be arranged to communicate with one or more other HEW devices, such as HEW devices 104 (FIG. 1) or access point 102 (FIG. 1) as well as communicate with legacy devices 106 (FIG. 1). HEW devices 104 and legacy devices 106 may also be referred to as HEW stations (STAs) and legacy STAs, respectively. HEW device 800 may be suitable for operating as access point 102 (FIG. 1) or an HEW device 104 (FIG. 1). In accordance with embodiments, HEW device 800 may include, among other things, physical layer (PHY) circuitry 802 and medium-access control layer circuitry (MAC) 804. PHY 802 and MAC 804 may be HEW compliant layers and may also be compliant with one or more legacy IEEE 802.11 standards. MAC 804 may be arranged to configure PPDUs and arranged to transmit and receive PPDUs, among other things. HEW device 800 may also include other hardware processing circuitry 806 and memory 808 configured to perform the various operations described herein.

In some embodiments, the MAC 804 may be arranged to contend for a wireless medium during a contention period to receive control of the medium for the HEW control period and configure an HEW PPDU. The PHY 802 may be arranged to transmit the HEW PPDU. The PHY 802 may include circuitry for modulation/demodulation, upconversion/downconversion, filtering, amplification, etc. In some embodiments, the hardware processing circuitry 806 may include one or more processors. In some embodiments, two or more antennas may be coupled to the PHY 802 and arranged for sending and receiving signals including transmission of the HEW packets. The memory 808 may be store information for configuring the other circuitry to perform operations for configuring and transmitting HEW packets and performing the various operations described herein.

In some embodiments, the HEW device 800 may be configured to communicate using OFDM communication signals over a multicarrier communication channel. In some embodiments, HEW device 800 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax standards and/or proposed specifications for WLANs, although the scope of the invention is not limited in this respect as they may also be suitable to transmit and/or receive communications in accordance with other techniques and standards.

In some embodiments, an HEW device 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The antennas may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the device 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point (HE-AP), the apparatus comprising:
   processing circuitry; and memory, the HE-AP configured for communication with a plurality of HE stations (HE-STAs) using a plurality of 20 MHz channels, the processing circuitry configured to:
   encode an HE physical-layer protocol data unit (PPDU) (HE-PPDU), the HE-PPDU to include:
   a plurality of signal fields including one or more non-HE signal fields and one or more HE signal fields, wherein the one or more HE signal fields include;
   a first HE signal field comprising a first portion in accordance with a binary phase-shift keying (BPSK) constellation and a second portion in accordance with either a BPSK or a quaternary binary phase shift keying (QBPSK) constellation, the BPSK constellation being different than the QBPSK constellation, and
   a second HE signal field, the second HE signal field to provide resource allocation information to the plurality of HE-STAs,
   wherein the resource allocation information is configurable to indicate a plurality of resource units (RUs) within each of the plurality of 20 MHz channels, the RUs configurable to have bandwidths less than 20 MHz to allow multiple RUs within each 20 MHZ channel,
   wherein the one or more non-HE signal fields are configured to follow a short training field (L-STF) and a long training field (L-LTF) of the HE-PPDU;
   obtain a transmission opportunity (TXOP) for transmission of the HE-PPDU, the first HE signal field being duplicated for transmission on each 20 MHz channel, the second HE signal field being separately encoded for transmission on each 20 MHz channel; and
   cause to transmit, during the TXOP, downlink data to the HE-STAs within the plurality of RUs in accordance with multi-user multiple input multiple output (MU-MIMO), or
   cause to receive, during the TXOP, uplink data from the HE-STAs within the plurality of RUs in accordance with orthogonal frequency division multiple access (OFDMA).

2. The apparatus of claim 1 wherein the processing circuitry is configured to select the constellation of the second portion of the first HE signal field to signal whether the HE-PPDU is for multi-user operation.

3. The apparatus of claim 1, wherein, based on an indication in one of the HE signal fields, the processing circuitry is to configure the HE-AP to: receive the uplink data from the HE-STAs in accordance with OFDMA, or transmit the downlink data to the HE-STAs in accordance with MU-MIMO.

4. The apparatus of claim 1 wherein the plurality of 20 MHz channels includes a primary 20 MHz channel and one or more secondary 20 MHz channels.

5. The apparatus of claim 1 wherein the processing circuitry is configured to encode the second HE signal field to comprise an indicator to indicate an arrangement of the RUs in frequency in a corresponding one of the 20 MHz channels of the plurality,
   wherein the second HE signal field is to configure the HE STAs to receive a data portion of the HE-PPDU in the corresponding 20 MHz channel, and
   wherein the second HE signal field is separately encoded for transmission on the corresponding 20 MHz channel of the HE PPDU.

6. The apparatus of claim 5 wherein the indicator further indicates a number of users allocated for MU-MIMO.

7. The apparatus of claim 1 wherein the processing circuitry is to encode the second HE signal field to comprise an indicator to indicate, for a 20 MHz channel, an RU arrangement of a plurality of RU arrangements in a frequency domain, the indicator to further indicate a number of MU-MIMO allocations, the RU arrangement comprising a mix of different RU sizes for the 20 MHz channel, wherein the HE signal field is to configure the HE stations to receive a data portion of the HE-PPDU, the data portion of the HE-PPDU configured in accordance with the RU arrangement.

8. The apparatus of claim 7 wherein the second HE signal field further comprises configuration parameters for each RU of the RU arrangement of the plurality of RU arrangements, and wherein the configuration parameters comprise one or more of the following fields: an indication of a modulation and coding scheme (MCS), an indicator if a Low-density parity-check code is to be used, and an indication if beamforming is to be used.

9. The apparatus of claim 1 further comprising transceiver circuitry coupled to a plurality of antennas, the transceiver circuitry configurable to:
   transmit, during the TXOP, the downlink data to the HE-STAs, within the plurality of RUs in accordance with MU-MIMO, and
   receive, during the TXOP, uplink data from the HE-STAs.

10. The apparatus of claim 1 wherein the memory is configured to store the resource allocation information.

11. A method performed by a high-efficiency (HE) access point (HE-AP), the HE-AP configured for communication with a plurality of HE stations (HE-STAs) using a plurality of 20 MHz channels, the method comprising:
    encoding an HE physical-layer protocol data unit (PPDU) (HE-PPDU), the HE-PPDU to include:
    a plurality of signal fields including one or more non-HE signal fields and one or more HE signal fields, wherein the one or more HE signal fields include;
    a first HE signal field comprising a first portion in accordance with a binary phase-shift keying (BPSK) constellation and a second portion in accordance with either a BPSK or a quaternary binary phase shift keying (QBPSK) constellation, the BPSK constellation being different than the QBPSK constellation, a second HE signal field, the second HE signal field to provide resource allocation information to the plurality of HE-STAs, wherein the resource allocation information is configurable to indicate a plurality of resource units (RUs) within each of the plurality of 20 MHz channels, the RUs configurable to have bandwidths less than 20 MHz to allow multiple RUs within each 20 MHZ channel, wherein the one or more non-HE signal fields are configured to follow a short training field (L-STF) and a long training field (L-LTF) of the HE-PPDU;

obtaining a transmission opportunity (TXOP) for transmission of the HE-PPDU, the first HE signal field being duplicated for transmission on each 20 MHz channel, the second HE signal field being separately encoded for transmission on each 20 MHZ channel; and causing the HE-AP to transmit, during the TXOP, downlink data to the HE-STAs within the plurality of RUs in accordance with multi-user multiple input multiple output (MU-MIMO), or causing the HE-AP to receive, during the TXOP, uplink data from the HE-STAs within the plurality of RUs in accordance with orthogonal frequency division multiple access (OFDMA).

12. The method of claim 11 further comprising selecting the constellation of the second portion of the first HE signal field to signal whether the HE-PPDU is for multi-user operation.

13. The method of claim 11, further comprising configuring, based on an indication in one of the HE signal fields, the HE-AP to: receive the uplink data from the HE-STAs in accordance with OFDMA, or transmit the downlink data to the HE-STAs in accordance with MU-MIMO.

14. A non-transitory computer-readable storage medium that stores instructions for execution by processing circuitry of a high-efficiency (HE) access point (HE-AP) to configure the HE-AP to perform operations communication with a plurality of HE stations (HE-STAs) using a plurality of 20 MHz channels, the processing circuitry configured to:

encode an HE physical-layer protocol data unit (PPDU) (HE-PPDU), the HE-PPDU to include:

a plurality of signal fields including one or more non-HE signal fields and one or more HE signal fields, wherein the one or more HE signal fields include;

a first HE signal field comprising a first portion in accordance with a binary phase-shift keying (BPSK) constellation and a second portion in accordance with either a BPSK or a quaternary binary phase shift keying (QBPSK) constellation, the BPSK constellation being different than the QBPSK constellation, and a second HE signal field, the second HE signal field to provide resource allocation information to the plurality of HE-STAs, wherein the resource allocation information is configurable to indicate a plurality of resource units (RUs) within each of the plurality of 20 MHz channels, the RUs configurable to have bandwidths less than 20 MHz to allow multiple RUs within each 20 MHZ channel, wherein the one or more non-HE signal fields are configured to follow a short training field (L-STF) and a long training field (L-LTF) of the HE-PPDU;

obtain a transmission opportunity (TXOP) for transmission of the HE-PPDU, the first HE signal field being duplicated for transmission on each 20 MHz channel, the second HE signal field being separately encoded for transmission on each 20 MHz channel; and cause to transmit, during the TXOP, downlink data to the HE-STAs within the plurality of RUs in accordance with multi-user multiple input multiple output (MU-MIMO), or cause to receive, during the TXOP, uplink data from the HE-STAs within the plurality of RUs in accordance with orthogonal frequency division multiple access (OFDMA).

15. The non-transitory computer-readable storage medium of claim 14 wherein the processing circuitry is configured to select the constellation of the second portion of the first HE signal field to signal whether the HE-PPDU is for multi-user operation.

16. The non-transitory computer-readable storage medium of claim 14, wherein, based on an indication in one of the HE signal fields, the processing circuitry is to configure the HE-AP to: receive the uplink data from the HE-STAs in accordance with OFDMA, or transmit the downlink data to the HE-STAs in accordance with MU-MIMO.

17. An apparatus of a high-efficiency (HE) station (HE-STA), the apparatus comprising:

processing circuitry; and memory, the HE-STA configured for communication with an HE access point (HE-A), the processing circuitry configured to:

decode an HE physical-layer protocol data unit (PPDU) (HE-PPDU) received within a transmission opportunity (TXOP), the HE-PPDU to include:

a plurality of signal fields including one or more non-HE signal fields and one or more HE signal fields, wherein the one or more HE signal fields include;

a first HE signal field comprising a first portion in accordance with a binary phase-shift keying (BPSK) constellation and a second portion in accordance with either a BPSK or a quaternary binary phase shift keying (QBPSK) constellation, the BPSK constellation being different than the QBPSK constellation, and a second HE signal field, the second HE signal field to provide resource allocation information to each of a plurality of HE-STAs, wherein the resource allocation information is configurable to indicate a plurality of resource units (RUs) within each of the plurality of 20 MHz channels, the RUs configurable to have bandwidths less than 20 MHz to allow multiple RUs within each 20 MHZ channel, wherein the one or more non-HE signal fields are configured to follow a short training field (L-STF) and a long training field (L-LTF) of the HE-PPDU, wherein the first HE signal field is duplicated on each 20 MHz channel and the second HE signal field is separately encoded on each 20 MHz channel; and decode, during the TXOP, downlink data for the HE-STA within the RUs indicated to the HE-STA, the downlink data received in accordance with multi-user multiple input multiple output (MU-MIMO), or encode for transmission, during the TXOP, uplink data from the HE-STA within the RUs indicated to the HE-STA, the uplink data transmitted in accordance with orthogonal frequency division multiple access (OFDMA).

18. The apparatus of claim 17 wherein the processing circuitry is configured to determine whether the HE-PPDU is for multi-user operation based on the constellation of the second portion of the first HE signal field.

19. The apparatus of claim 17, wherein, based on an indication in one of the HE signal fields, the processing circuitry is to configure the HE-STA to: transmit the uplink data in accordance with OFDMA, or receive the downlink data in accordance with MU-MIMO.

20. The apparatus of 17, wherein the memory is configured to store the resource allocation information indicated for the HE-STA.

\* \* \* \* \*